United States Patent
Stafford et al.

(10) Patent No.: US 12,318,684 B2
(45) Date of Patent: Jun. 3, 2025

(54) SYSTEMS AND METHODS FOR DETERMINING A TYPE OF MATERIAL OF AN OBJECT IN A REAL-WORLD ENVIRONMENT

(71) Applicant: Sony Interactive Entertainment Inc., Tokyo (JP)

(72) Inventors: Jeffrey Stafford, Redwood City, CA (US); Andrew Young, San Mateo, CA (US); Todd Tokubo, Newark, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 146 days.

(21) Appl. No.: 17/589,854

(22) Filed: Jan. 31, 2022

(65) Prior Publication Data

US 2023/0241491 A1   Aug. 3, 2023

(51) Int. Cl.
*A63F 13/215*   (2014.01)
*A63F 13/217*   (2014.01)
*G02B 27/01*    (2006.01)

(52) U.S. Cl.
CPC .......... *A63F 13/215* (2014.09); *A63F 13/217* (2014.09); *G02B 27/0101* (2013.01); *G02B 2027/014* (2013.01)

(58) Field of Classification Search
CPC .. A63F 13/2145; A63F 13/215; A63F 13/216; A63F 13/217; A63F 13/218; A63F 13/219; G02B 27/0101; G02B 27/014; G02B 2027/014
See application file for complete search history.

(56) References Cited

U.S. PATENT DOCUMENTS

| | | | | |
|---|---|---|---|---|
| 9,852,548 | B2 * | 12/2017 | Greco | G02B 27/0093 |
| 9,855,497 | B2 * | 1/2018 | Goslin | G06F 3/017 |
| 10,154,360 | B2 * | 12/2018 | Lovitt | H04S 7/302 |
| 10,176,820 | B2 * | 1/2019 | Muehlhausen | G06F 3/011 |
| 10,213,692 | B2 * | 2/2019 | Velic | G06V 20/64 |

(Continued)

OTHER PUBLICATIONS

PCT/US2023/011185 Notification of Transmittal of the International Search Report and the Written Opinion of the International Searching Authority, or the Declaration, PCT/ISA/220, and the International Search Report, PCT/ISA/210, Apr. 18, 2023.

*Primary Examiner* — David L Lewis
*Assistant Examiner* — Matthew D Hoel
(74) *Attorney, Agent, or Firm* — Kilpatrick, Townsend & Stockton, LLP

(57) ABSTRACT

Methods and systems for determining a type of material of an object in a real-world environment are described. One of the methods includes receiving a plurality of sets of audio data based on sounds received from a plurality of objects within a plurality of environments. The method further includes receiving a plurality of sets of input data regarding a plurality of types of materials of the plurality of objects, training an artificial intelligence (AI) model based on the plurality of sets of audio data and the plurality of sets of input data, and applying the AI model to a set of audio data captured from the real-world environment to determine the type of material of the object within the real-world environment to enhance the realism of augmented reality (AR) or virtual reality (VR) video games and applications.

22 Claims, 13 Drawing Sheets

(56) References Cited

U.S. PATENT DOCUMENTS

| | | | | |
|---|---|---|---|---|
| 10,272,324 B2* | 4/2019 | Holmes | | A63F 13/215 |
| 10,300,373 B2* | 5/2019 | Hickman | | A63F 13/25 |
| 11,110,343 B2* | 9/2021 | Hickman | | G06F 16/51 |
| 11,337,023 B2* | 5/2022 | Leider | | A63F 13/577 |
| 11,481,979 B2* | 10/2022 | Choi | | G06V 40/10 |
| 11,536,970 B1* | 12/2022 | Kulkarni | | G06V 10/82 |
| 11,632,646 B2* | 4/2023 | Leider | | A63F 13/285 |
| | | | | 381/300 |
| 11,636,843 B2* | 4/2023 | Tajik | | H04S 3/008 |
| | | | | 381/303 |
| 2016/0055674 A1* | 2/2016 | Mullins | | G02B 27/017 |
| | | | | 345/633 |
| 2016/0260441 A1* | 9/2016 | Muehlhausen | | G06F 3/012 |
| 2017/0182405 A1* | 6/2017 | Holmes | | A63F 13/211 |
| 2017/0296913 A1* | 10/2017 | Numaguchi | | G06F 3/017 |
| 2017/0304732 A1* | 10/2017 | Velic | | A63F 13/213 |
| 2018/0117469 A1* | 5/2018 | Ilse | | A63F 13/215 |
| 2019/0076731 A1* | 3/2019 | Hickman | | G06F 16/51 |
| 2019/0134508 A1* | 5/2019 | Matsuzawa | | A63F 13/213 |
| 2019/0340435 A1* | 11/2019 | Rabinovich | | G06F 3/0346 |
| 2019/0392641 A1* | 12/2019 | Taylor | | G06T 19/006 |
| 2020/0081120 A1* | 3/2020 | Soldner | | G01S 15/10 |
| 2020/0410982 A1* | 12/2020 | Liu | | G10L 13/08 |
| 2021/0038989 A1* | 2/2021 | Ilse | | A63F 13/54 |
| 2021/0093973 A1* | 4/2021 | Edridge | | A63F 13/213 |
| 2021/0174492 A1* | 6/2021 | Karaaslan | | G06T 7/0004 |
| 2021/0195360 A1* | 6/2021 | Leider | | G06F 3/165 |
| 2021/0205707 A1* | 7/2021 | Velic | | G06N 5/04 |
| 2021/0375257 A1* | 12/2021 | Tajik | | G10L 25/57 |
| 2022/0240044 A1* | 7/2022 | Leider | | G06F 3/167 |
| 2022/0258053 A1* | 8/2022 | Ilse | | A63F 13/54 |
| 2022/0345842 A1* | 10/2022 | Schembri | | H04R 3/04 |
| 2023/0131469 A1* | 4/2023 | Karaaslan | | G02B 27/0172 |
| | | | | 382/197 |
| 2023/0173387 A1* | 6/2023 | Sangston | | A63F 13/424 |
| | | | | 381/1 |
| 2023/0199420 A1* | 6/2023 | Dorn | | H04S 7/301 |
| | | | | 345/633 |
| 2023/0217205 A1* | 7/2023 | Leider | | A63F 13/285 |
| | | | | 463/31 |
| 2023/0223003 A1* | 7/2023 | Tajik | | G10L 25/57 |
| | | | | 381/303 |
| 2024/0042318 A1* | 2/2024 | Ilse | | A63F 13/215 |
| 2024/0091650 A1* | 3/2024 | Palacios | | A63F 13/67 |

* cited by examiner

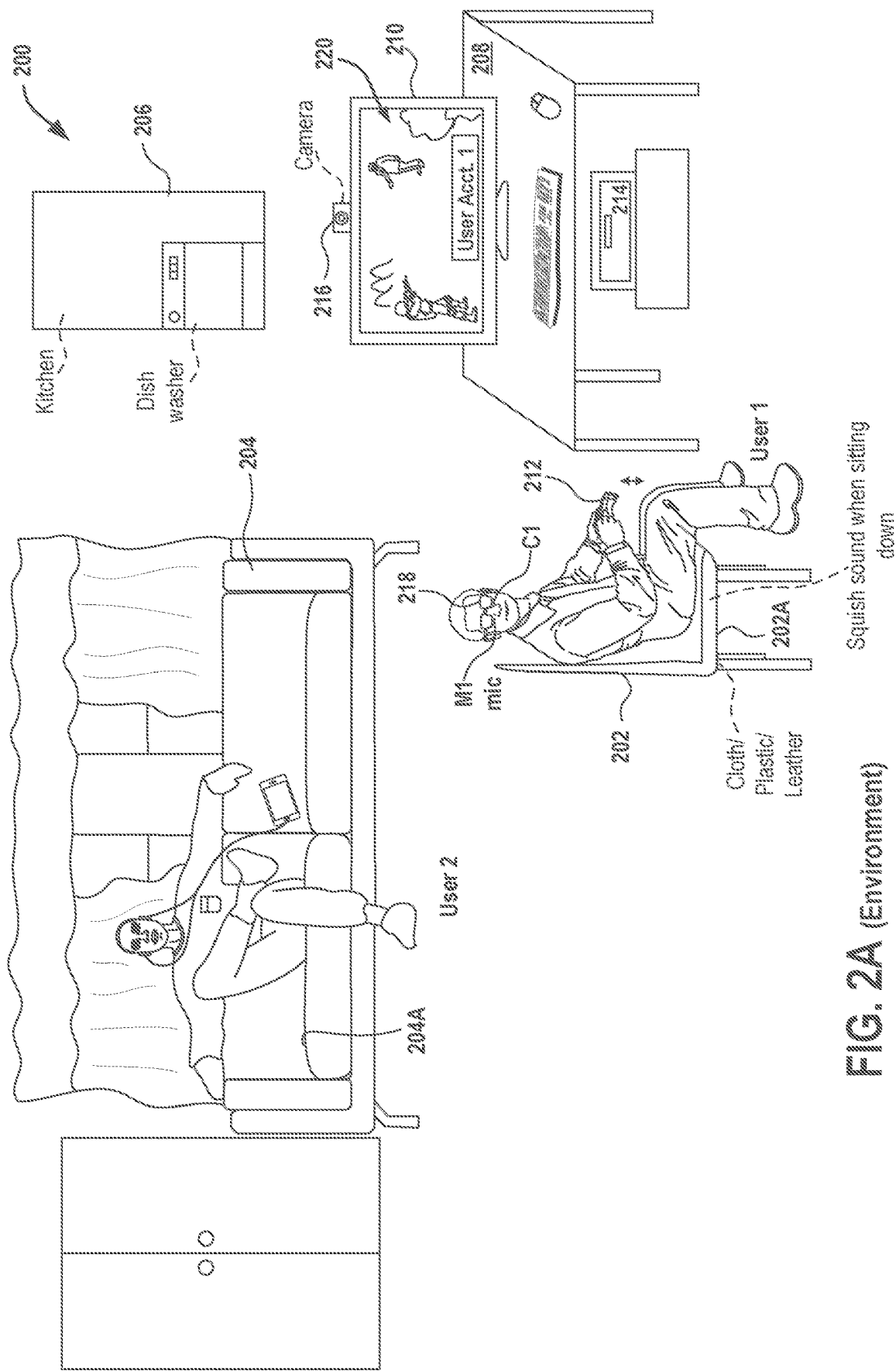
FIG. 2A (Environment)

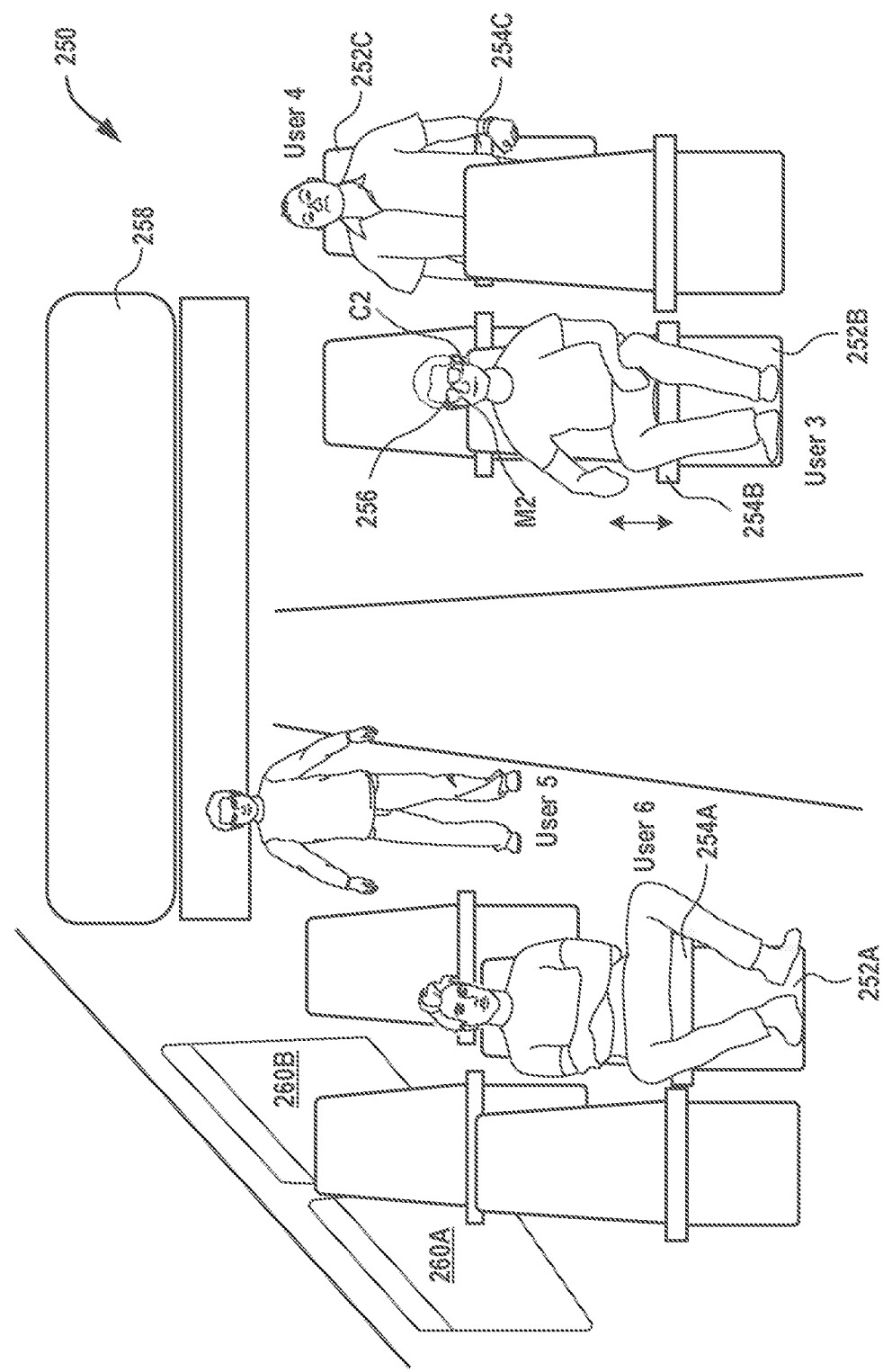
FIG. 2B (Bus)

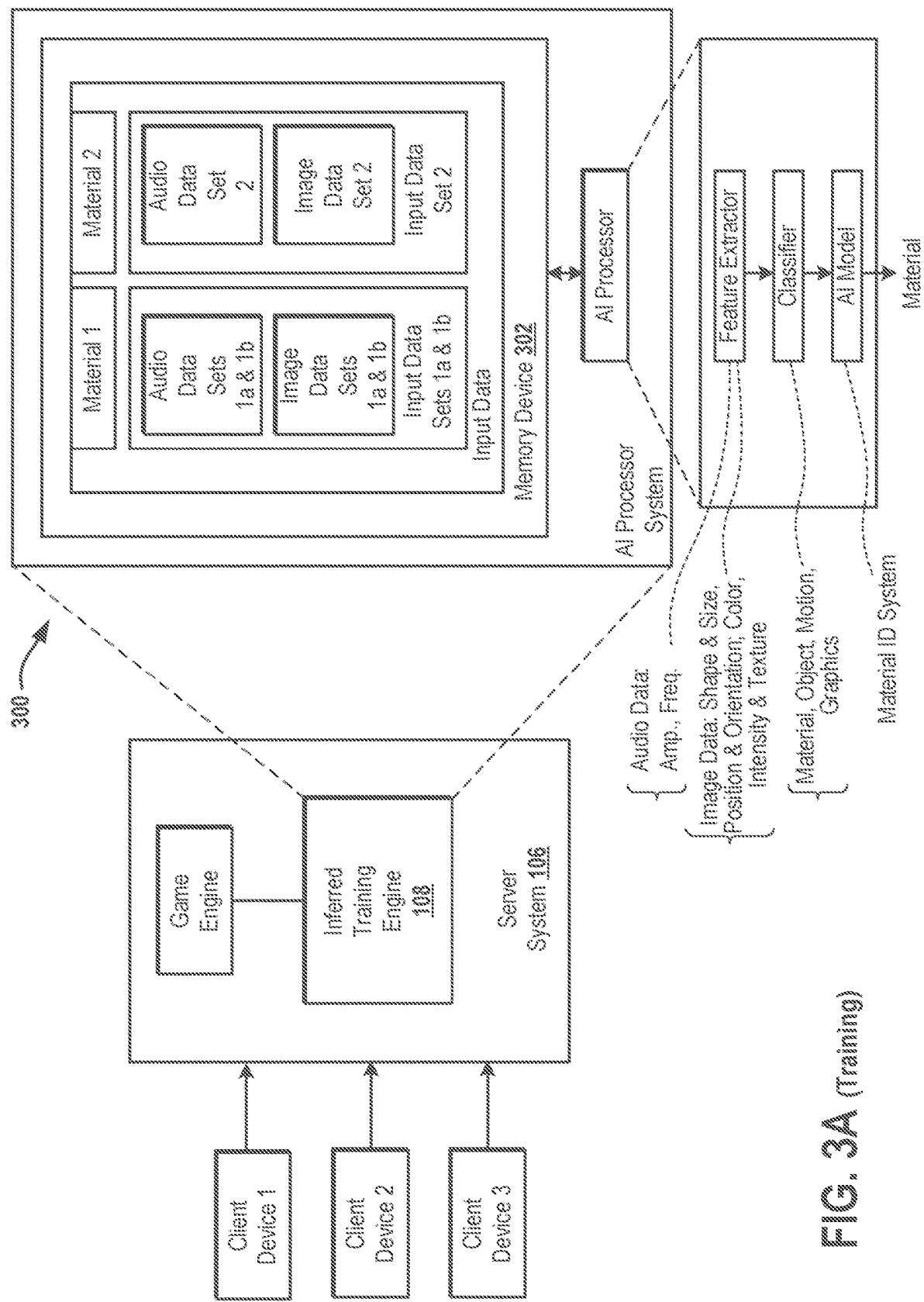
FIG. 3A (Training)

| Identity | Audio Data Set | Audio Parameters | Material Type | Cover Type |
|---|---|---|---|---|
| I1a | 1a | AP1a | 1ax | 1ay |
| I1b | 1b | AP1b | 1bx | 1by |
| I2 | 2 | AP2 | 2x | 2y |
| ... | ... | ... | ... | ... |

FIG. 3B

| Image Data Set | Features | | | | |
|---|---|---|---|---|---|
| | Identity | Audio Parameters | Physical Parameters | Graphical Parameters | Mat. Type | Cover Type |
| I1a | I1a | AP1a | PP1a | GP1a ↔ | 1ax | 1ay |
| I1b | I1b | AP1b | PP1b | GP1b ↔ | 1bx | 1by |
| 2 | I2 | AP2 | PP2 | GP2 ↔ | 2x | 2y |

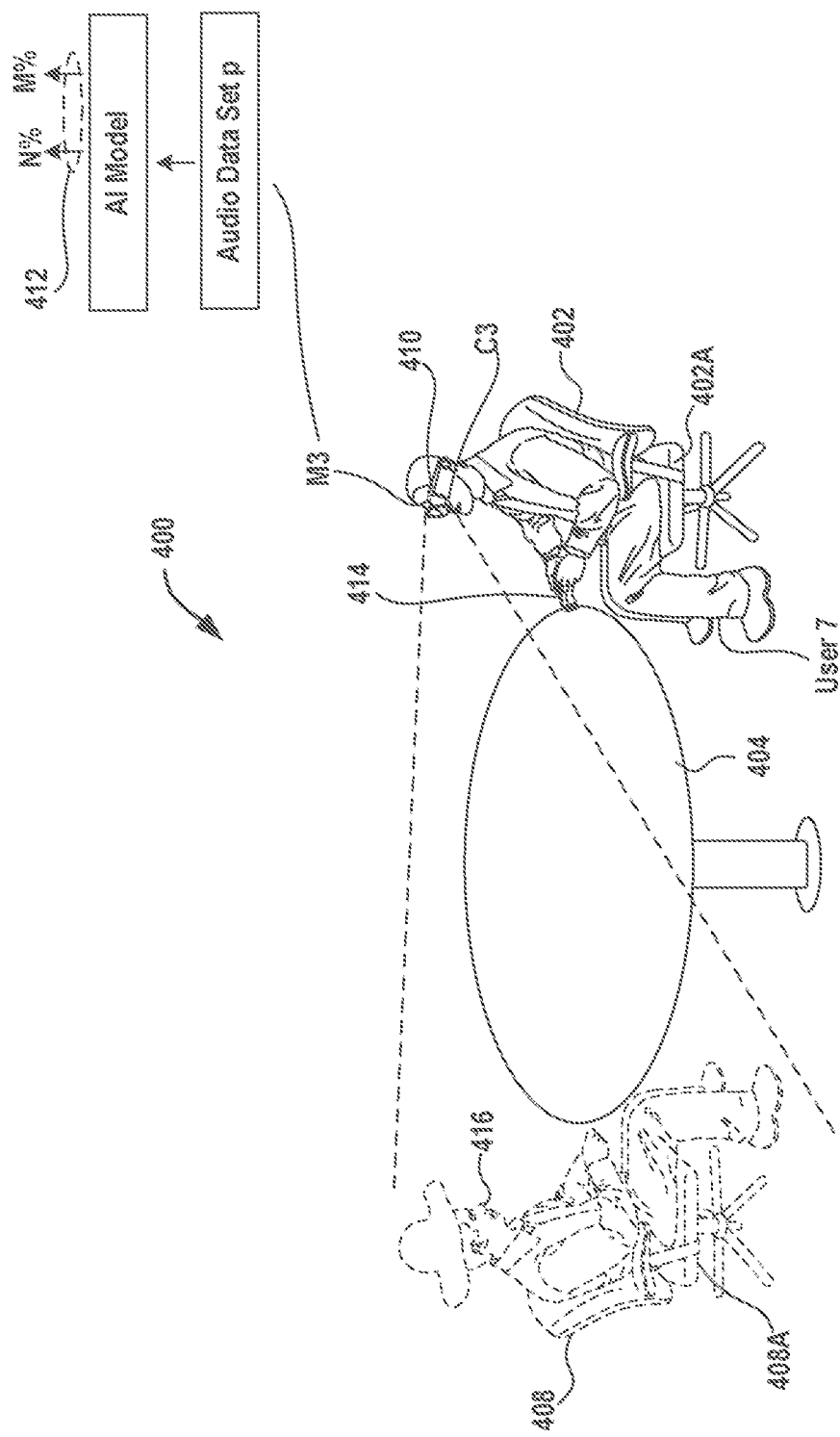
FIG. 4A (Environment)

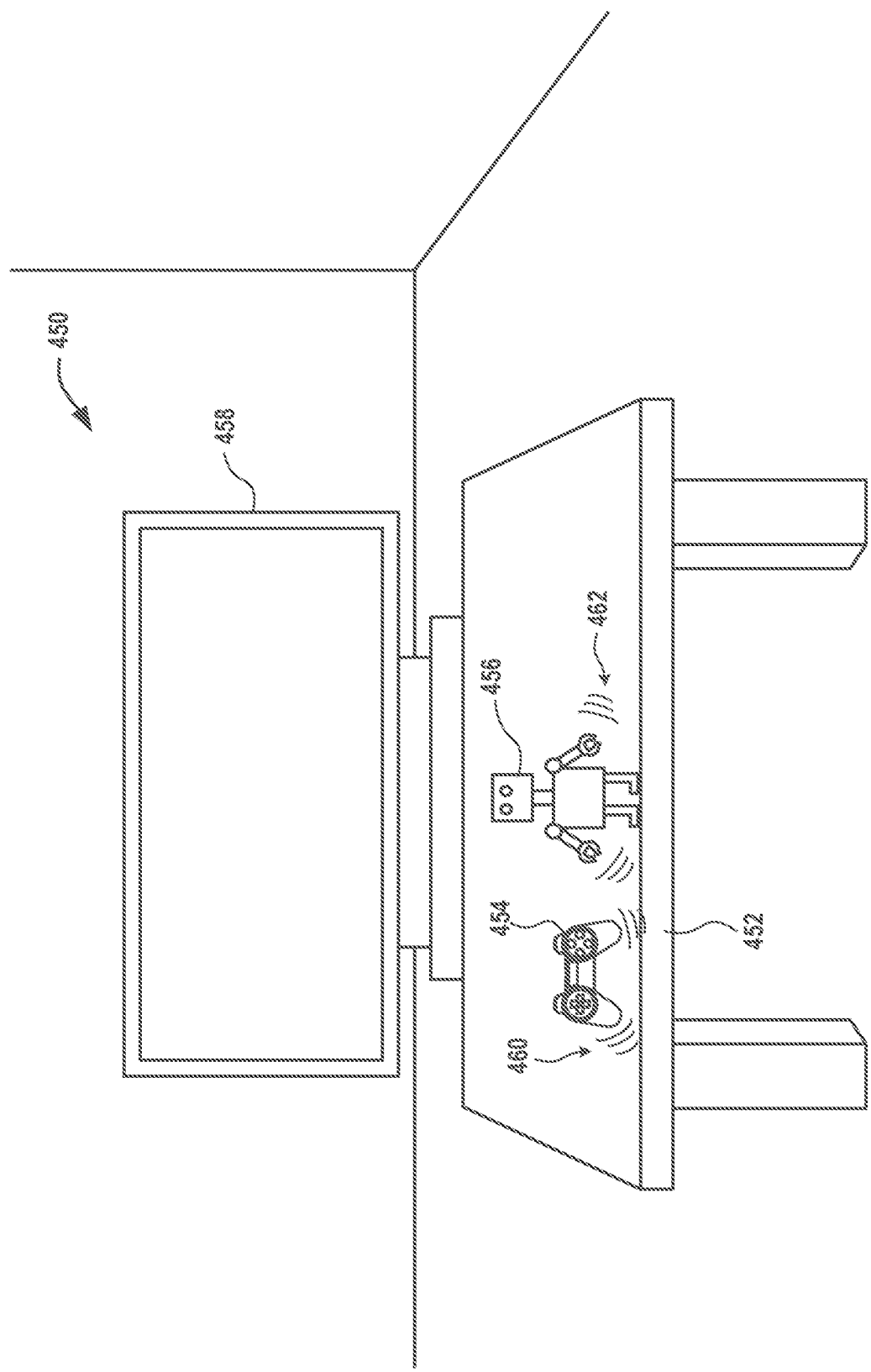

SYSTEMS AND METHODS FOR DETERMINING A TYPE OF MATERIAL OF AN OBJECT IN A REAL-WORLD ENVIRONMENT

FIELD

The present disclosure relates to systems and methods for determining a type of material of an object in a real-world environment.

BACKGROUND

In a multi-player game, there are multiple game players. Each player wears a head-mounted display (HMD) to play the game or to view an environment that is generated by execution of an application. During a play of the game or execution of the application, there are several objects displayed in the HMD. However, sometimes, a player cannot get a sense of these objects in the environment.

It is in this context that embodiments of the invention arise.

SUMMARY

Embodiments of the present disclosure provide systems and methods for determining a type of material of an object in a real-world environment.

In an embodiment, a material of an object in the real-world environment has characteristics, which can produce sounds when those materials are interfaced with, such as compressed, touched, moved, and the like. For example, a user sits on a chair and the chair reacts with noise based on physical characteristics of a material of a seat of the chair. To illustrate, the seat of the chair is made from plastic, and has a squishy sound reminiscent of air being released when the user sits on it. By determining the characteristics of the object, it is possible to utilize that information to augment a virtual space, such as a virtual reality (VR) environment or an augmented reality (AR) environment, to mimic the object that is being interfaced with. For example, if the user sits on a squishy chair in the real-world environment, a similar squishy chair having similar characteristics reminiscent or associated with sounds being detected as the user sits on the chair can be portrayed in an AR view or a VR space. As another example, if the user sits on a bus seat, which is made of cheap plastic and foam, a virtual bus seat having similar characteristics reminiscent or associated with sounds being detected as the user sits can be portrayed in an AR view or a VR space. For purposes of utilizing the characteristics, a VR replication of a type of chair can be made to illustrate a virtual user sitting on the same type of chair. Thus, there is a mapping from the real-world environment to the virtual space, utilizing audio cues from the real-world environment to mimic and replicate surfaces, sounds, and characteristics of the object of the real-world environment when a similar virtual object is placed in the virtual space. Physics associated with sounds made by real-world objects can be replicated by virtual objects in the virtual space. Thus, physics replicated into the virtual space can show a virtual seat of a virtual chair being deflated as a virtual user or character in a game sits on the virtual chair.

In an embodiment, when a particular material or object is deformed in the real-world, lighting, sound and other environmental characteristics are detected to determine how that material or object behaves in the real-world. The behavior of the real-world object is then utilized in the virtual space to show a virtually changing object consistent with the deformation and changes occurring in the real-world environment.

In one embodiment, a method for determining a type of material of an object in a real-world environment is described. The method includes receiving a plurality of sets of audio data based on sounds received from a plurality of objects within a plurality of environments. The method further includes receiving a plurality of sets of input data regarding a plurality of types of materials of the plurality of objects, trains and/or performs inference on an artificial intelligence (AI) model based on the plurality of sets of audio data and the plurality of sets of input data, and applying the AI model to a set of audio data captured from the real-world environment to determine the type of material of the object within the real-world environment. As an example, the input data includes audio data, image data, light detection and ranging (LiDAR) data, or additional input data, such as inertial measurement unit (IMU) data, or a combination of the audio data, the image data, the LiDAR data, and the additional input data.

In an embodiment, a server for determining a type of material of an object in a real-world environment is described. The server includes a processor that receives a plurality of sets of audio data based on sounds received from a plurality of objects within a plurality of environments. The processor further receives a plurality of sets of input data regarding a plurality of types of materials of the plurality of objects. The processor also trains and/or performs inference on an AI model based on the plurality of sets of audio data and the plurality of sets of input data. As an example, the input data includes audio data, image data, LiDAR data, or additional input data, such as IMU data, or a combination of the audio data, the image data, the LiDAR data, and the additional input data. The processor applies the AI model to a set of audio data captured from the real-world environment to determine the type of material of the object within the real-world environment. The server includes a memory device coupled to the processor.

In one embodiment, a system for determining a type of material of an object in a real-world environment is described. The system includes a plurality of client devices. The plurality of client devices generate a plurality of sets of audio data based on sounds received from a plurality of objects within a plurality of environments. The client devices also receive a plurality of sets of input data regarding a plurality of types of materials of the plurality of objects. As an example, the input data includes audio data, image data, LiDAR data, or additional input data, such as IMU data, or a combination of the audio data, the image data, the LiDAR data, and the additional input data. The system further includes a server coupled to the plurality of client devices via a computer network. The server receives the plurality of sets of audio data via the computer network from the plurality of client devices, receives the plurality of sets of input data via the computer network from the plurality of client devices, and trains and/or performs inference on an AI model based on the plurality of sets of audio data and the plurality of sets of input data. The server applies the AI model to a set of audio data captured from the real-world environment to determine the type of material of the object within the real-world environment.

Some advantages of the herein described systems and methods include providing a manner of guiding blind people where to sit. For example, a blind person wears an eyeglass. The eyeglass outputs sound to the blind person indicating a type of material of a seat within a real-world environment.

In case a first seat is fabricated from a hard material compared to a second seat that has a soft cushion material, the eyeglass will indicate so to the blind person. The blind person can then sit on the second seat. Further, in the example, audio data regarding sounds emitted by seats as other people sit down or stand up is received by the AI model. The AI model can be trained based on the audio data. Then AI model is then applied to determine whether the blind person is about to sit on the hard material or on the soft cushion material.

Additional advantages of the herein described systems and methods include providing tools for creating a metaverse, which appears real to a user. For example, the systems and methods create a virtual seat that has the characteristics, such as a type of material and graphical and physical parameters, of a seat in the real-world environment. By using the AI model to determine the type of material, the virtual seat is presented to be photorealistic. To illustrate, a physics engine can apply physics regarding with the type of material to enable realistic virtual gameplay associated with the interactions with the type of material by virtual objects.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 2A is a diagram of an embodiment of a system to illustrate one of multiple environments of the system of FIG. 1.

FIG. 2B is a diagram of an embodiment of a system to illustrate a method for capturing audio data and image data for training an artificial intelligence (AI) model.

FIG. 3A is a diagram of an embodiment of a system to illustrate training of the AI model based on multiple audio data sets, or a combination of multiple image data sets and the audio data sets.

FIG. 3B is a diagram of an embodiment of a table to illustrate associations between a set that includes the audio data sets and multiple audio parameters, and a set that includes types of materials of the seats and types of materials of covers of the seats of the systems of FIGS. 2A and 2B.

FIG. 3C is a diagram of an embodiment of a table to illustrate associations between a set that includes the audio data sets, the audio parameters, the image data sets, multiple physical parameters, and multiple graphical parameters, and a set that includes the types of materials of the seats and the types of materials of covers of the seats of the systems.

FIG. 4A is a diagram of an embodiment of a system to illustrate a method for determining a probability that a material of a seat is of a type and a probability that a material of a cover of the seat is of a type.

FIG. 4B is a diagram of an embodiment of a system to illustrate an augmented reality (AR) video game played using the methods described herein.

DETAILED DESCRIPTION

Systems and methods for determining a type of material of an object in a real-world environment are described. It should be noted that various embodiments of the present disclosure are practiced without some or all of these specific details. In other instances, well known process operations have not been described in detail in order not to unnecessarily obscure various embodiments of the present disclosure.

Figure 1:
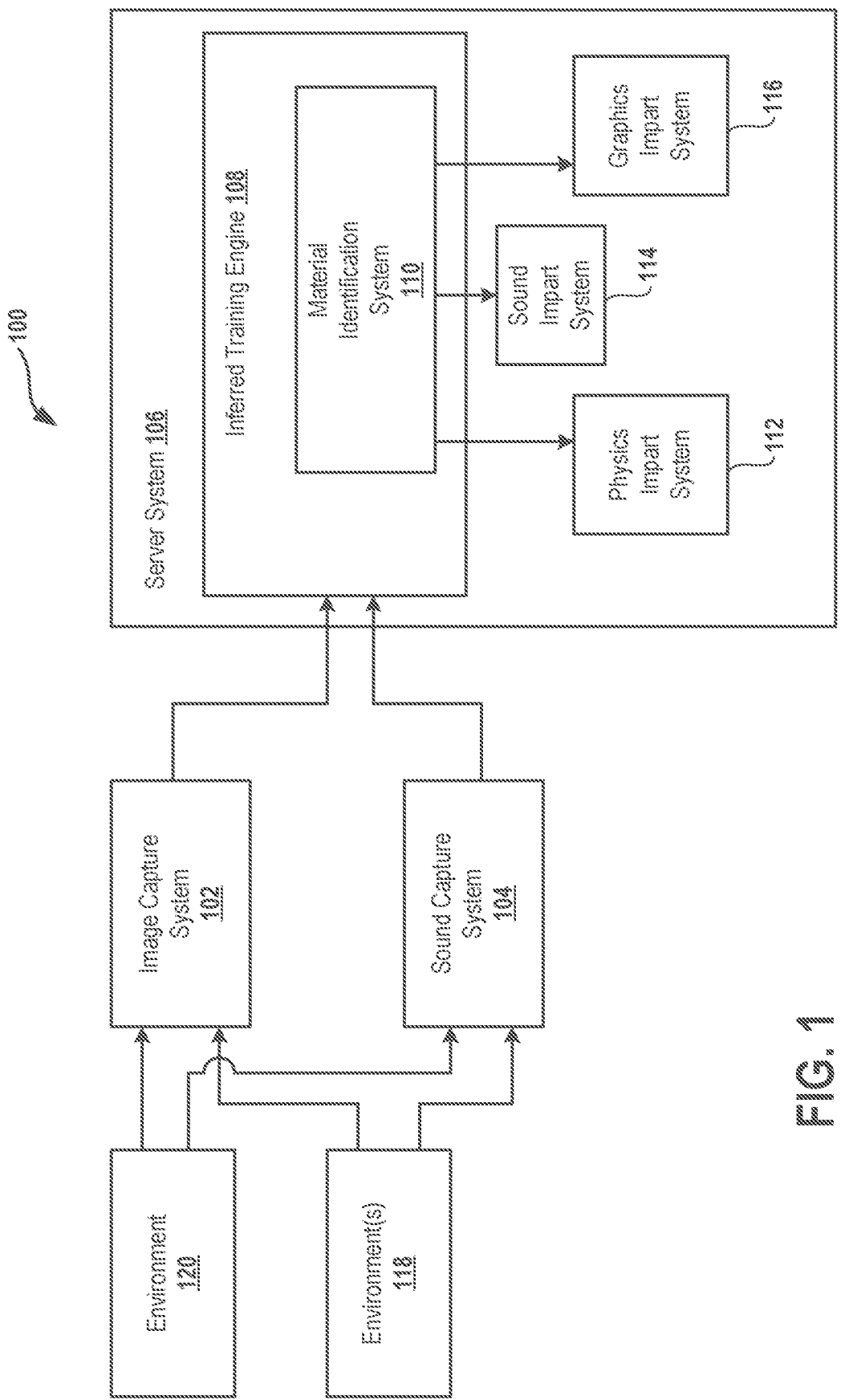
FIG. 1 is a diagram of an embodiment of a system for illustrating a method for replicating characteristics of a real-world object in a virtual world.

FIG. 1 is a diagram of an embodiment of a system 100 for illustrating a method for replicating characteristics of a real-world object in a virtual world. The system includes an image capture system 102, a sound capture system 104, and a server system 106. An example of the image capture system 102 includes one or more cameras, such as depth cameras and digital cameras. To illustrate, the one or more cameras are located on a head-mounted display (HMD) or an AR glass, or on a display device, or on a game console, or are stand-alone cameras. An example of the sound capture system 104 includes one or more microphones. To illustrate, the one or more microphones are a part of the HMD, or the AR glass, or the display device, or the game console, or are stand-alone microphones. Examples of the server system 106 include multiple servers within a data center or multiple servers of a virtual machine or a combination of processors and memory devices.

Examples of a processor, as used herein, include an application specific integrated circuit (ASIC), a programmable logic device (PLD), a central processing unit (CPU), and a combination thereof. Examples of a memory device, as used herein, include a read-only memory (ROM), a random access memory (RAM), and a combination thereof. To illustrate, a memory device is a Flash memory device or a redundant array of independent disks (RAID).

The server system 106 includes an inferred training engine 108, which includes a material identification system 110. As an illustration, an engine, as used herein, is a computer program that is executed by one or more of the processors of the server system 106. A computer program is an example of software. As another illustration, an engine, as used herein, includes an ASIC or a PLD or a combination thereof. It should be noted that an ASIC, a PLD, and a processor are examples of hardware. An example of the material identification system 110 is hardware, or software, or a combination thereof.

The server system 106 includes a physics impart system 112, a sound impart system 114, and a graphics impart system 116. An example of any of the physics impart system 112, the sound impart system 114, and the graphics impart system 116 is hardware, or software, or a combination thereof.

The image capture system 102 and the sound capture system 104 are coupled to the inferred training engine 108. Then material identification system 110 is coupled to the physics impart system 112, the sound impart system 114, and the graphics impart system 116.

The system 100 further includes multiple environments 118 and an environment 120. The environments 118 and the environment 120 are real-world environments. As an example, a real-world environment exists outside a virtual reality (VR) environment or an augmented reality (AR) environment. To illustrate, a real-world environment cannot be created by a processor.

Image data is captured, such as generated, by the image capture system 102 from the environments 118. Also, audio data is captured by the sound capture system 104 from the environments 118. The inferred training engine 108 is trained according to the audio data or a combination of the audio data and the image data.

The sound capture system 102 captures audio data from the environment 120. The audio data captured from the environment 120 is sent from the sound capture system 102 to the material identification system 110. The material identification system 110, which is trained based on the audio data captured from the environments 118 or the combination of the audio data and the image data captured from the environments 118, identifies one or more materials of one or more real-world objects within the environment 120 to output one or more identities of the one or more materials, and provides the one or more identities to the physics impart system 112, the sound impart system 114, and the graphics impart system 116. Examples of real-world objects include a seat of a chair, a seat cushion of the chair, a seat of a sofa, a seat cushion of a sofa, a cushion on a back of the chair, a cushion on a back of the sofa, a cushion on an armrest of the chair, a cushion on an armrest of the sofa, a dining table having a top fabricated from wood, and a dining table having a top made from glass.

The physics impart system 112 imparts physical parameters, such as motion according to laws of physics or changes in positions and orientations according to the laws, to one or more virtual objects in a virtual environment displayed on a display device located within the environment 120. An example of the virtual environment is a virtual scene, such as a VR scene or an AR scene. Examples of a display device include an HMD, an AR eyeglass, a computer monitor, and a television. The laws of physics are imparted to the one or more virtual objects based on one or more types of the one or more materials of the one or more real-world objects.

Moreover, the sound impart system 114 imparts one or more sound parameters, such as one or more combinations of amplitudes and frequencies, to the one or more virtual objects in the virtual environment. For example, a first sound is to be output by when a first virtual object is to be displayed within the virtual environment as having physics that is imparted to the first virtual object and a second sound is to be output when a second virtual object is to be displayed within the virtual environment as having physics that is imparted to the second virtual object. In the example, the first sound is to be output by one or more speakers of the display device located within the environment 120 and the second sound is to be output by the one or more speakers.

Additionally, the graphics impart system 116 imparts one or more sets of graphical parameters, such as intensities, colors, and textures, to the one or more virtual objects to be displayed within the virtual environment. As an example, the first virtual object is controlled by one or more processors, such as a CPU, or a graphical processing unit (GPU), or a combination thereof, of the display device located within the environment 120 to have a first set of graphical parameters when the first virtual object is to be displayed within the virtual environment as having the physical parameters imparted to the first virtual object. Further, in the example, the second virtual object is controlled by the one or more processors of the display device located within the environment 120 to have a second set of graphical parameters when the second virtual object is to be displayed within the virtual environment as having the physical parameters imparted to the second virtual object.

In one embodiment, the inferred training engine 108 is the same as the material identification system 110.

In an embodiment, the system 100 excludes the image capture system 102.

In one embodiment, the terms capture and generate are used herein interchangeably.

FIG. 2A is a diagram of an embodiment of a system 200 to illustrate one of the environments 118. An example of the system 200 is a room within a house or a room within a cabin or a room within a building. The system 200 is an example of one of the environments 118. The system 200 includes multiple real-world objects, such as an office chair 202, a sofa 204, a curtain behind the sofa 204, an entry door to the left of the sofa 204, an entryway to a kitchen 206, a desk 208, a computer monitor 210, a keyboard, a computer mouse, a hand-held controller 212, and a game console 214. The sofa 204 has a seat 204A on which a user 2 sits. As an example, the seat 204A is fabricated from a material, such as cloth, leather, corduroy, linen, or a combination thereof. The kitchen occupies another room of the system 200 and has a dishwasher. On top of the computer monitor 210 is a camera 216, which is an example of the image capture system 102 (FIG. 1).

The hand-held controller 212 is coupled to the game console 214, which is coupled to the display device 210 and to the server system 106 via a computer network. Examples of the computer network include the Internet, an Intranet, and a combination thereof. The camera 216 is coupled to the game console 214 or to the eyeglass 218 or to both the eyeglass 218 and the game console 214. For example, the camera 216 is coupled to the eyeglass 218 via a wireless connection, such as a Bluetooth™ connection, or a wired connection. The game console 214 accesses the game from the server system 106 and provides virtual environment data to the display device 210 to display a virtual scene 220. The virtual scene 220 includes multiple virtual objects, such as virtual characters, and a virtual background, such as a virtual tree and a virtual mountain range. An eyeglass 218 is coupled to the server system 106 via the computer network. For example, the eyeglass 218 is coupled to the server system 106 via the game console 214 and the computer network. As another example, the eyeglass 218 is directly coupled to the server system 106 via the computer network without using the game console 214. Examples of an eyeglass include an HMD and an AR eyeglass.

A user 1 sits on the office chair 202 and is holding the hand-held controller 212 for playing a game. As an example, a game engine of the game is executed by one or more processors of the server system 106 (FIG. 1) to generate the virtual scene 220 of the game. The office chair 202 has a seat 202A, which is fabricated from a material, such as leather, and is covered by a plastic cover. Also, the user 1 is wearing the eyeglass 218, which includes a microphone M1 and a camera C1. The microphone M1 is an example of the sound capture system 104 (FIG. 1). The camera C1 is attached to and located below a bottom surface of the eyeglass 218. For example, a lens of the camera C1 faces down towards a floor of the system 200 when the user 1 is wearing the eyeglass

218. To illustrate, a field-of-view of the camera C1 is towards the floor of a room in which the user 1 is located. As another example, a field-of-view of the camera C1 is wide enough to capture images of movements of the seats 202A and 204A. Also, the user 2 is listening to music on his/her smartphone. The camera C1 is an example of the image capture system 102 (FIG. 1).

The user 1 accesses the game from the server system 106 via the computer network and plays the game, which has the virtual scene 220 represented on the display device 210. For example, the user 1 selects one or more buttons on the hand-held controller 212 to provide authentication information, such as a user name and a password. The hand-held controller 212 sends the authentication information to the game console 214 which forwards the authentication information via the computer network to the server system 106. The server system 106 determines whether the authentication information is authentic and upon determining so, provides access to a user account 1 and the game engine that executes on the server system 106. When the game engine is executed by the one or more processors of the server system 106, image frames of the game are generated and encoded to output encoded image frames. The encoded image frames are sent to the game console 214. The game console 214 decodes the encoded image frames and provides the image frames to the display device 210 to display the virtual scene 220 of the game to allow the user 1 to play the game. While the user 1 is playing the game, the virtual scene 220 of the game is displayed on the display device 210.

The user 1 turns on the eyeglass 218 before or during the play of the game. After the user 1 turns on the eyeglass 218, the microphone M1 captures an audio data set 1a associated with the seat 202A. For example, before playing the game, the user 1 sits on the office chair 202 and a sound emitted by the sitting motion of the user is detected by the microphone M1 to capture or output or generate the audio data set 1a. To illustrate, the microphone M1 captures a squeaking sound of the seat 202A when the seat 202A is compressed or a sound of air blowing when the seat 202A is compressed to generate the audio data set 1a. In the illustration, the seat 202A is compressed when the user 1 sits on the seat 202A. As another illustration, the microphone M1 captures a squeaking or a creaking sound of the seat 202A when the seat 202A is decompressed to generate the audio data set 1a. In the illustration, the seat 202A is decompressed when the user 1 stands up from the seat 202A. As another illustration, during a play of the game, the user 1 jumps up and down on the seat 202A and the microphone M1 captures multiple squeaking sounds of the seat 202A when the seat 202A compresses and decompresses for multiple times. In the illustration, the sounds are detected to capture the audio data set 1a. As still another illustration, the microphone M1 captures a sound of the dishwasher operating in the kitchen in conjunction with sounds emitted due to movement of the seat 202A to output the audio data set 1a. The audio data set 1a is further described below with reference to FIG. 3A.

Also, after the user 1 turns on the eyeglass 218, the microphone M1 captures an audio data set 1b associated with the seat 204A. As an illustration, the microphone M1 detects sounds that are emitted by the user 2 while sitting on or standing up from the seat 204A. In the illustration, the user 2 sits on or stands up from the seat 204A before or during the play of the game by the user 1. Also, in the illustration, the sounds are detected to capture, such as generate, the audio data set 1b. As still another illustration, the microphone M1 captures a sound of the dishwasher operating in the kitchen in conjunction with sounds emitted due to movement of the seat 204A to output the audio data set 1b. The audio data set 1b is further described below with reference to FIG. 3A.

The camera C1 or the camera 216 of a combination of the cameras C1 and 216 detects movement of the seat 202A and other objects in the system 200 to capture an image data set 1a associated with the seat 202A. To illustrate, one or more of the cameras C1 and 216 captures image data of the seat 202A as the user 1 sits on the seat 202A or jumps up and down on the seat 202A or stands up from the seat 202A.

Also, camera C1 or the camera 216 of a combination of the cameras C1 and 216 detects movement of the seat 204A and other objects in the system 200 to capture or output an image data set 1b associated with the seat 204A. As an illustration, one or more of the cameras C1 and 216 captures image data of the seat 204A during a time period in which the user 2 sits on the seat 204A or stands up from the seat 204A or jumps up and down on the seat 204A.

The camera 216 sends the image data sets 1a and 1b via the computer network to the server system 106 to train the AI model. For example, the camera 216 sends the image data sets 1a and 1b via the wireless connection to the eyeglass 218 for transferring the image data sets 1a and 1b to the server system 106. As another example, the camera 216 sends the image data sets 1a and 1b via the game console 214 and the computer network to the server system 106.

The eyeglass 218 transfers the image data sets 1a and 1b and the audio data sets 1a and 1b via the computer network to the server system 106 (FIG. 1) for training an artificial intelligence (AI) model. For example, the eyeglass 218 sends the image data sets 1a and 1b and the audio data sets 1a and 1b via the game console 214 and the computer network to the server system 106. As another example, the eyeglass 218 sends the image data sets 1a and 1b and the audio data sets 1a and 1b via the computer network to the server system 106 without using the game console 214.

In one embodiment, instead of playing the game, the user 1 accesses an application from the server system 106 (FIG. 1), and a virtual environment of the application is displayed on the display device to 10. An example of the application includes a video conferencing application or a chat application or a social networking application.

In an embodiment, the eyeglass 218 does not include the camera C1 and there is no generation of the image data sets 1a and 1b.

In an embodiment, the AI model is sometimes referred to herein as a machine learning model.

In an embodiment, the seat 202A is fabricated from plastic or cloth or vinyl or mesh or bonded leather or polyurethane or memory foam, or another material.

In one embodiment, a backrest of the office chair 202 is fabricated from the same material as that of the seat 202 or from a different material than the seat 202.

In an embodiment, the office chair 202 includes a headrest, which is fabricated from the same material as that of the seat 202 or from a different material than the seat 202.

In one embodiment, the office chair 202 includes two armrests, and each armrest is fabricated from the same material as that of the seat 202 or from a different material than the seat 202.

In an embodiment, the camera C1 is attached at another position on the eyeglass 218. For example, the camera C1 is fixed to a side surface of the eyeglass 218 and a lens of the camera C1 faces down towards the floor of the system 200.

In one embodiment, one or more additional cameras are attached to the eyeglass 218. For example, a second camera is attached to a left rim of the eyeglass 218. In the example, the second camera also has a lens that faces down towards the floor of the system 200. Further, in the example, the camera C1 is attached to a right rim of the eyeglass 218.

In one embodiment, in addition to the user 1, the user 2 wears an eyeglass, such as an AR glasses or an HMD. The eyeglass captures audio data sets from sounds detected from the system 200 and/or captures image data sets of movements of seats in the system 200 for sending the audio data sets and/or the image data sets via the computer network to the server system 106. The eyeglass worn by the user 2 is coupled via the computer network to the server system 106.

In an embodiment, the user 1 accesses the user account 1 after logging into the user account 1 by using the eyeglass 218. For example, the eyeglass 218 is coupled, via a wired or a wireless connection, with an input controller. The user 1 selects one or more buttons on the input controller to provide the authentication information. Upon receiving the authentication information, the input controller generates input signals according to the authentication information, and sends the input signals to the eyeglass 218 via the wired or wireless connection. The eyeglass 218 sends the authentication information via the computer network or via both the game console 214 and the computer network to the server system 106. The server system 106 upon determining that the authentication information is authentic allows the user 1 to log into the user account 1.

In one embodiment, both the seats 202A and 204B are made from the same material.

In an embodiment, covers of the seats 202A and 204B are made from the same material.

In one embodiment, an audio data set is sometimes referred to herein as audio frames and an image data set is sometimes referred to herein as image frames.

In an embodiment, a seat in a real-world environment is an example of an object or a type of object in the real-world environment. For example, the identity of the seat 202A indicates that a type of an object in the system 200 is the seat 202A and the identity of the seat 204A indicates that a type of an object in the system 200 is the seat 204A.

FIG. 2B is a diagram of an embodiment of a system 250 to illustrate a method for capturing audio data and image data for training the AI model. The system 250 includes a real-world environment inside a vehicle, such as a bus or a van. The system 250 is an example of one of the environments 118 (FIG. 1). The system 250 includes multiple bus chairs 252A, 252B, and 252C. The bus chairs 252A and 252B are arranged in a row, and the bus chair 252C is behind the bus chair 252B. A user 3 sits on a seat 254B of the bus chair 252B and a user 4 sits on a seat 254C of the bus chair 252C. Also, a user 5 is standing in the vehicle and a user 6 sits on a seat 254A of the bus chair 252A. As an example, each of the seats 254A through 254C is fabricated from a material, such as wool or plastic or cloth. As another example, each of the seats 254A through 254C is made from a material, such as a cloth and covered by a material, such as a vinyl cover or a plastic cover. As yet another example, each seat 254A through 254C is made from a material that is different from a material from which the seat 202A (FIG. 2A) is made. As still another example, each seat 254A through 254C is made from a material that is different from a material from which the seat 204A (FIG. 2A) is fabricated.

The user 3 is wearing an eyeglass 256, which includes a camera C2 and a microphone M2. The eyeglass 256 is coupled to the server system 106 via the computer network. For example, the eyeglass 256 is directly coupled to the server system 106 via the computer network without using a game console (not shown).

The microphone M2 is an example of the sound capture system 104 (FIG. 1). The camera C2 is attached to and located below a bottom surface of the eyeglass 256. For example, a lens of the camera C2 faces down towards a floor of the system 250 when the user 3 is wearing the eyeglass 256. To illustrate, a field-of-view of the camera C2 is towards the floor of a vehicle in which the user 3 is traveling. As another example, a field-of-view of the camera C2 is wide enough to capture images of movements of the seats 254A and 254B. The system 250 includes a rear window 258 and multiple side windows 260A and 260B. The camera C2 is an example of the image capture system 102 (FIG. 1).

The microphone M2 detects sounds emitted within the real-world environment of the vehicle to output an audio data set 2. For example, the microphone M2 senses a sound of the user 3 sitting on the seat 254B and the seat 254B moving up and down during movement of the vehicle on a road to output the audio data set 2. As another example, the M2 senses a sound of the user 3 standing up from the seat 254B before or during movement of the vehicle on the road to output the audio data set 2. As yet another example, the microphone M2 senses a sound of the user 6 sitting on the seat 254A and the seat 254A moving up and down during movement of the vehicle on a road to output the audio data set 2. As another example, the M2 senses a sound of the user 6 standing up from the seat 254A before or during movement of the vehicle on the road to output the audio data set 2. As still another example, the microphone M2 senses a sound of the user 4 sitting on the seat 254C and the seat 254C moving up and down during movement of the vehicle on a road to output the audio data set 2. As another example, the M2 senses a sound of the user 4 standing up from the seat 254C before or during movement of the vehicle on the road to output the audio data set 2. The audio data set 2 is further described below.

Also, the camera C2 of the eyeglass 256 detects movement of one or more of the seats 254A through 254C to generate an image data set 2. For example, the camera C2 detects motion of the seat 254B when the user 3 sits on the seat 254B or jumps up and down on the seat 254B or moves on the seat 254B due to motion of the vehicle or stands up from the seat 254B to output an image data set 2. Moreover, as another example, the camera C2 detects movement of the seat 254A when the user 6 sits on the seat 254A or jumps up and down on the seat 254A or moves on the seat 254A due to motion of the vehicle or stands up from the seat 254A to output the image data set 2. As yet another example, the camera C2 detects movement of the seat 254C when the user 4 sits on the seat 254C or jumps up and down on the seat 254C or moves on the seat 254C due to motion of the vehicle or stands up from the seat 254C to output the image data set 2. In the example, the camera C2 detects movement of the seat 254C when the seat 254C is within a field-of-view of the camera C2. To illustrate, when the user 3 is facing towards the bus chair 252C after standing up from the seat 254B and leaning towards the seat 254C to talk to the user 4, the camera C2 detects movement of the seat 254C. The audio data set 2 and the image data set 2 are sent from the eyeglass 256 via the computer network to the server system 106 for training the AI model.

It should be noted that a user sitting on a seat, the user jumping up and down on the seat, the user moving on the seat, the user touching the seat, the user using his/her hand to decompress or compress the seat, and the user standing up from the seat are examples of interaction by the user with the seat.

In one embodiment, one or more additional cameras are attached to the eyeglass 256. For example, a second camera is attached to a left rim of the eyeglass 256. In the example, the second camera also has a lens that faces down towards the floor of the system 250. Further, in the example, the camera C2 is attached to a right rim of the eyeglass 256.

In one embodiment, in addition to the user 3, one or more of the users 4-6 wears respective one or more eyeglasses, such as AR glasses or HMDs. Each eyeglass captures audio data sets from sounds detected from the system 250 and/or captures image data sets of movements of seats in the system 250 for sending the audio data sets and/or the image data sets via the computer network to the server system 106.

In an embodiment, the eyeglass 256 does not include the camera C2 and there is no generation of the image data set 2.

In an embodiment, the user 3 accesses a user account 3 after logging into the user account 3 by using the eyeglass 256. For example, the eyeglass 256 is coupled, via a wired connection or a wireless connection, with an input controller. The user 3 selects one or more buttons on the input controller to provide authentication information. Upon receiving the authentication information, the input controller generates input signals based on the authentication information and sends the input signals to the eyeglass 256 via the wired or wireless connection. The eyeglass 256 sends the authentication information via the computer network to the server system 106. The server system 106 upon determining that the authentication information received from the eyeglass 256 is authentic allows the user 3 to log into the user account 3.

In one embodiment, the seats 254A-254C are made from the same material.

In an embodiment, the seat 254A is made from a different material than a material of the seat 254B or 254C.

In an embodiment, covers of the seats 254A-254C are made from the same material.

In an embodiment, the cover of the seat 254A is made from a different material than a cover of the material of the seat 254B or 254C.

In one embodiment in which the user 3 is in a room having a game console, the eyeglass 256 is coupled to the server system 106 via the game console and the computer network.

In an embodiment in which the user 3 is in a room having a game console, the eyeglass 256 is coupled to the server system 106 via the computer network without using the game console.

Figure 2C:
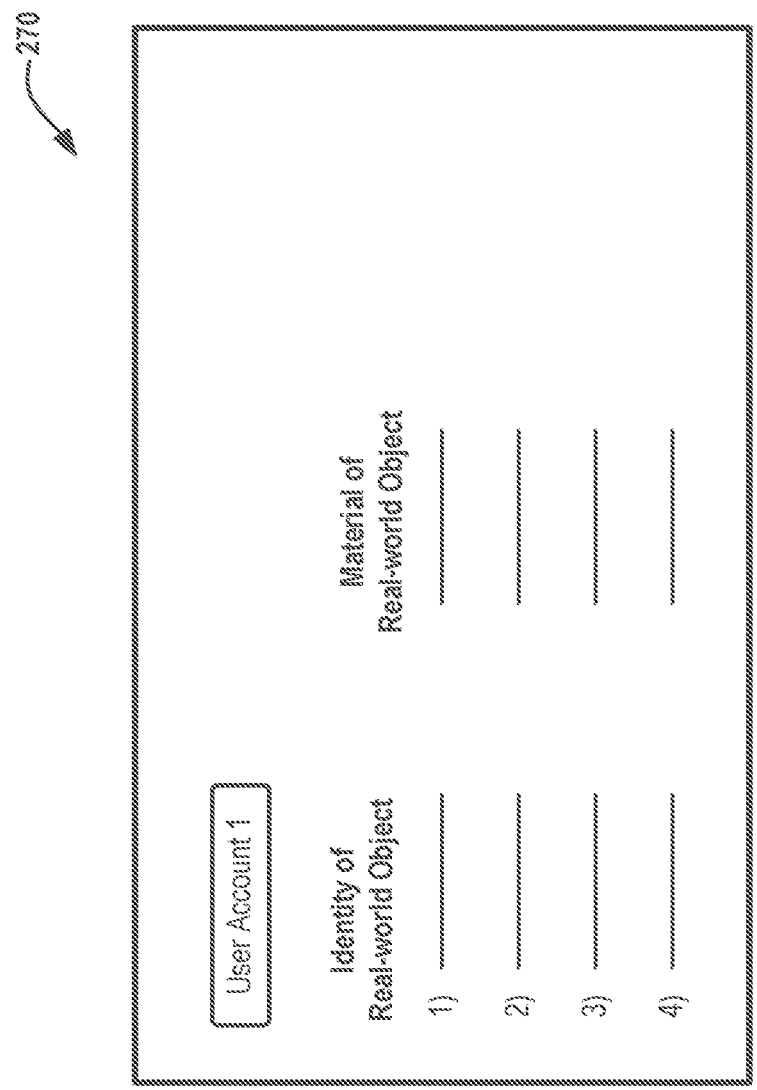
FIG. 2C is a diagram of an embodiment of a list of types of materials of seats and their covers in the system of FIG. 2A.

FIG. 2C is a diagram of an embodiment of a list 270 of types of materials of seats and their covers in the system 200 (FIG. 2A). The eyeglass 218 (FIG. 2A) displays the list 270 on one or more display screens of the eyeglass 218. For example, in response to the user 1 logging into the user account 1, a CPU of the eyeglass 218 controls a GPU of the eyeglass 218 to display the list 270 on the one or more display screens of the eyeglass 218. In the example, the CPU of the eyeglass 218 receives the list 270 from the one or more processors of the server system 106 (FIG. 1) via the computer network, and controls the GPU of the eyeglass 218 to display the list 270 on the eyeglass 218. In the example, the list 270 is generated by the one or more processors of the server system 106.

The list 270 includes a space for receiving a type of material of the seat 202A (FIG. 2A) with which the user 1 interacts and another space for receiving a type of material of the seat 204A (FIG. 2A) with which the user 2 interacts. The list 270 further includes a space for receiving a type of material used to cover the seat 202A and another space for receiving a type of material used to cover the seat 204A. The list 270 also includes spaces for receiving identities, such as names or types, of the real-world objects, such as the seat 202A of the chair 202, the seat 204A of the chair 204, and covers of the seats 202A and 204A.

The user 1 logs into the user account 1 and accesses the list 270. The user 1 selects one or more buttons on the input controller that is coupled to the eyeglass 218 to provide the identities, such as names, of the real-world objects, such as the seat 202A of the chair 202, the seat 204A of the chair 204, and covers of the seats 202A and 204A. Also, the user 1 selects the one or more buttons on the input controller that is coupled to the eyeglass 218 to provide the types of materials of the seats 202A and 204A, the type of material used to cover the seat 202A, and the type of material used to cover the seat 204A. For example, the user 1 selects the one or more buttons of the input controller coupled to the eyeglass 218 to spell a type of material, such as plastic, or leather, or vinyl, used for the seat 202A and selects the one or more buttons to spell a type of material used to cover of the seat 202A. As another example, the user 1 selects the one or more buttons of the input controller coupled to the eyeglass 218 to spell that that the seat 202A is a seat of an office chair and the seat 204A is a seat of a sofa.

Upon receiving the identities of the real-world objects, such as the seat 202A of the chair 202 and the seat 204A of the chair 204, and receiving the types of materials of the seats 202A and 204A and the types of materials of the covers for the seats 202A and 204A, the eyeglass 218 sends the identities of the real-world objects, the types of materials of the seats 202A and 204A and the types of materials of the covers of the seats 202A and 204A via the computer network to the server system 106 or via the game console 214 and the computer network to the server system 106 for training the AI model. As an example, the eyeglass 218 includes a CPU that receives the identity of the seat 202A as the seat of the office chair and assigns an alphanumeric character 1a to the identity of the seat 202A. The alphanumeric character 1a assigned to the identity of the seat 202A is sometimes referred to herein as an identity I1a. As another example, the CPU of the eyeglass 218 receives the identity of the seat 204A to be the seat of the sofa and assigns an alphanumeric character, such as 1b, to the identity of the seat 204A. The alphanumeric character 1b assigned to the identity of the seat 204A is sometimes referred to herein as an identity I1b.

In one embodiment, instead of making selections for the types of materials of the seats 202A and 204A and the covers for the seats 202A and 204A by using the input controller that is coupled to the eyeglass 218, the selections are made using eye gestures. For example, the eyeglass 218 includes an internal camera that faces eyes of the user 1. The user 1 makes eye gestures, which are detected by the internal camera, to identify the seat 202A of the chair 202, the seat 204A of the sofa 204, a type of material of the seat 202A and a type of material of the cover of the seat 202A. To illustrate, the user 1 makes the eye gestures to select the identity of the seat 202A of the chair 202, the type of material of the seat 202A and the type of material of the cover of the seat 202A from the list 270. The internal camera captures image data having the eye gestures. A CPU of the eyeglass 218 receives the identities of the seats 202A and 204A, the types of materials of the seats 202A and 204A and the types of materials of the cover of the seats 202A and 204A selected using the eye gestures. The CPU sends the list 270 including the identities of the seats 202A and 204A, the types of materials of the seats 202A and 204A and the types of materials of the cover of the seats 202A and 204A via the computer network or via both the game console 214 and the computer network to the server system 106 for training the AI model.

In an embodiment, the image data having the eye gestures is sent from the eyeglass 218 to the server system 106 via the computer network. The one or more processors of the server system 106 analyze the image data to identify the eye gestures to obtain the identity of the seat 202A of the chair 202, the identity of the seat 204A of the sofa 204, the types of materials of the seats 202A and 204A, and the types of materials of the covers of the seats 202A and 204A.

In an embodiment, the hand-held controller 212 is used in place of the input controller that is used with the eyeglass 218.

In one embodiment, the list 270 is pre-populated with the identity of the seat 202A as a seat of the chair 202 and the identity of the seat 204A as a seat of the sofa 204. For example, once the user 1 logs into the user account 1, and the camera C1 captures the image data sets 1a and 1b, the one or more processors of the server system 106 generate the list 270, and send the list 270 via the computer network to the eyeglass 218. The one or more processors of the server system 106 determine from the image data sets 1a and 1b that the system 200 includes the office chair 202, the sofa 204, the seats 202A and 204A, and covers of the seats 202A and 204A. To illustrate, the one or more processors compare a pre-stored shape of a pre-stored object, such as an office chair, or a sofa, or a seat, or a cover of the seat, with a shape of image of an object, such as the office chair 202, the sofa 204, the seat 202A, the seat 204A, a cover of the seat 202A, and a cover of the seat 204A. In the illustration, the comparison is made to determine whether there is a similarity between the two shapes, and if the similarity exists, identify the object as the pre-stored object. An illustration of similarity of the two shapes is when the two shapes are the same. Another illustration of similarity of the two shapes is when a majority of the pre-stored shape matches a majority of the shape of image of the object.

Figure 2D:
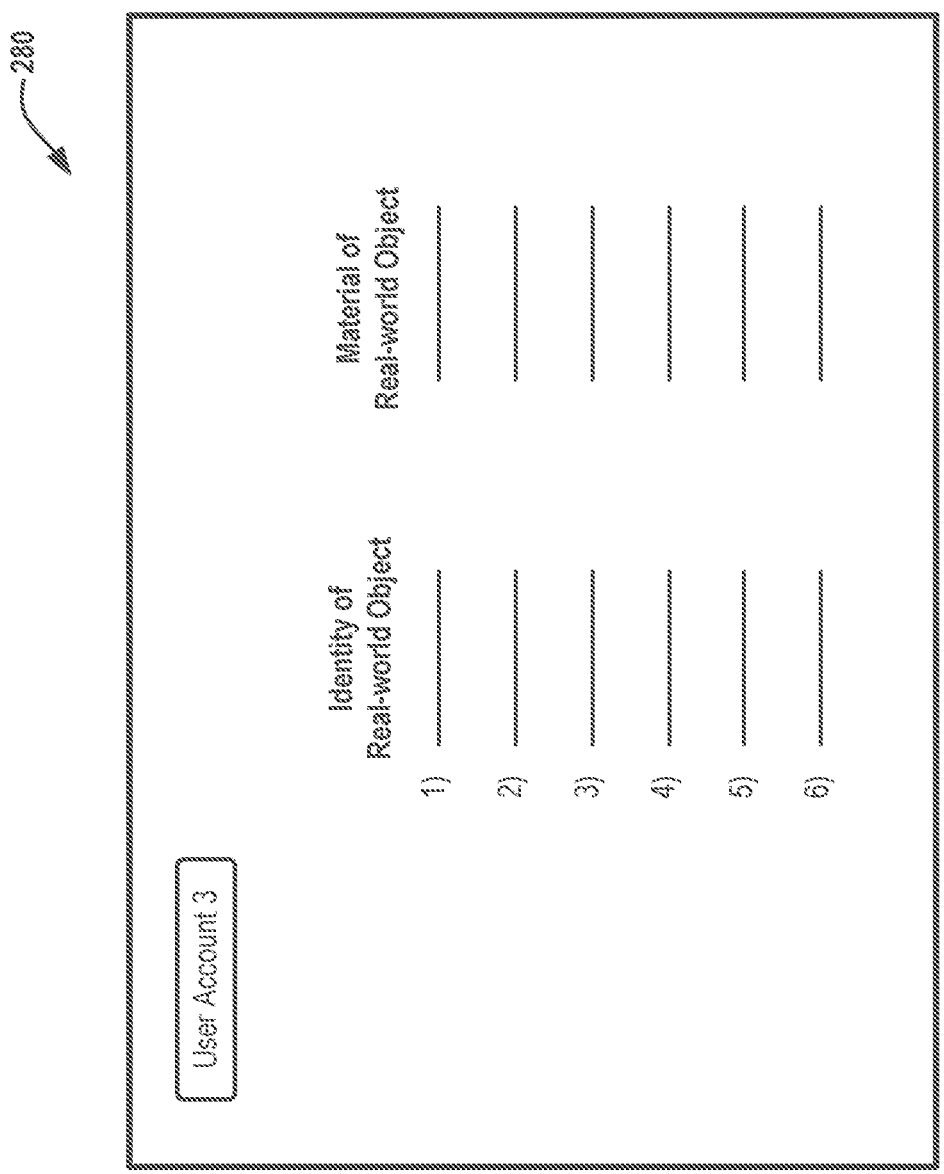
FIG. 2D is a diagram of an embodiment of a list of types of materials of seats and their covers in the system of FIG. 2B.

FIG. 2D is a diagram of an embodiment of a list 280 of types of materials of seats and their covers in the system 250 (FIG. 2B). The eyeglass 256 (FIG. 2B) displays the list 280 on one or more display screens of the eyeglass 256. For example, in response to the user 3 logging into the user account 3, a CPU of the eyeglass 256 controls a GPU of the eyeglass 256 to display the list 280 on the one or more display screens of the eyeglass 256. In the example, the CPU of the eyeglass 256 receives the list 280 from the one or more processors of the server system 106 (FIG. 1) via the computer network, and controls the GPU of the eyeglass 256 to display the list 280 on the eyeglass 256. In the example, the list 280 is generated by the one or more processors of the server system 106.

The list 280 includes a space for receiving a type of material of the seat 254B (FIG. 2B) with which the user 3 interacts, another space for receiving a type of material of the seat 254A (FIG. 2A) with which the user 6 interacts, and yet another space for receiving a type of material of the seat 254C with which the user 4 interacts. The list 280 further includes a space for receiving a type of material used to cover the seat 254B, another space for receiving a type of material used to cover the seat 254A, and yet another space for receiving a type of material used to cover the seat 254C. The list 280 also includes spaces for receiving identities, such as names or types, of the real-world objects, such as the seat 254B of the bus chair 252B, the seat 254A of the bus chair 252A, and the seat 254C of the bus chair 252C, and covers of the seats 254A through 254C.

The user 3 logs into the user account 3 and accesses the list 280. The user 3 selects one or more buttons on the input controller that is coupled to the eyeglass 256 to provide the identities, such as names, of the real-world objects, such as the seat 254B of the bus chair 252B, the seat 254A of the bus chair 252A, the seat 254C of the bus chair 252C, and covers of the seats 254A through 254C. Also, the user 3 selects the one or more buttons on the input controller that is coupled to the eyeglass 256 to provide the types of materials of the seats 254A through 254C and the types of materials used to cover the seats 254A through 254C. For example, the user 3 selects the one or more buttons of the input controller coupled to the eyeglass 256 to spell a type of material, such as plastic, or leather, or vinyl, used for the seat 254B and selects the one or more buttons to spell a type of material used to cover of the seat 254B. As another example, the user 3 selects the one or more buttons of the input controller coupled to the eyeglass 256 to spell that the seat 254B is a seat of a bus chair.

Upon receiving the identities of the real-world objects, such as the seat 254B of the bus chair 252B, the seat 254A of the bus chair 252A, the seat 254C of the bus chair 252C, and receiving the types of materials of the seats 254A through 254C and the types of materials of the covers for the seats 254A through 254C, the eyeglass 256 sends the identities of the real-world objects, the types of materials of the seats 254A through 254C and the types of materials of the covers of the seats 254A through 254C via the computer network to the server system 106 for training the AI model. As an example, the eyeglass 256 includes a CPU that receives the identity of the seat 254B as the seat of the bus chair and assigns an alphanumeric character 2 to the identity of the seat 254B. The alphanumeric character 2 assigned to the identity of the seat 254B is sometimes referred to herein as an identity I2.

In one embodiment, instead of making selections for the types of materials of the seats 254A through 254C and the covers for the seats 254A through 254C by using the input controller that is coupled to the eyeglass 256, the selections are made using eye gestures. For example, the eyeglass 256 includes an internal camera that faces eyes of the user 3. The user 3 makes eye gestures, which are detected by the internal camera, to identify the seat 254B of the bus chair 252B, a type of material of the seat 254B and a type of material of the cover of the seat 254B. To illustrate, the user 3 makes the eye gestures to select the identity of the seat 254B of the bus chair 252B, the type of material of the seat 254B and the type of material of the cover of the seat 254B from the list 280. The internal camera captures image data having the eye gestures. A CPU of the eyeglass 256 receives the identities of the seats 254A through 254C, the types of materials of the seats 254A through 254C and the types of materials of the covers of the seats 254A through 254C selected using the eye gestures. The CPU sends the list 280 including the identities of the seats 254A through 254C, the types of materials of the seats 254A through 254C and the types of materials of the covers of the seats 254A through 254C via the computer network to the server system 106 for training the AI model.

In an embodiment, the image data having the eye gestures is sent from the eyeglass 256 to the server system 106 via the computer network. The one or more processors of the server system 106 analyze the image data to identify the eye gestures to obtain the identity of the seat 254A of the bus chair 252A, the seat 254B of the bus chair 252B, the seat 254C of the bus chair 252C, the type of materials of the seats 254A through 254C, and the types of materials of the covers of the seats 254A through 254C.

In an embodiment, a hand-held controller is used in place of the input controller that is used with the eyeglass 256.

In one embodiment, the list 280 is pre-populated with the identity of the seat 254A as a seat of the bus chair 252A, the identity of the seat 254B as a seat of the bus chair 252B, and the identity of the seat 254C as a seat of the bus chair 252C. For example, once the user 3 logs into the user account 3, and the camera C2 captures the image data set 2, the one or more processors of the server system 106 generate the list 280, and send the list 280 via the computer network to the eyeglass 256. The one or more processors of the server system 106 determine from the image data set 2 that the system 250 includes the bus chairs 252A through 252C, the seats 254A through 254C, and the covers of the seats 254A through 254C. To illustrate, the one or more processors compare a pre-stored shape of a pre-stored object, such as a bus chair, or a seat, or a cover of the seat, with a shape of image of an object, such as the bus chair 252B, the seat 254B, and a cover of the seat 254B. In the illustration, the comparison is made to determine whether there is a similarity between the two shapes, and if the similarity exists, identify the object as the pre-stored object.

FIG. 3A is a diagram of an embodiment of a system 300 to illustrate training of the AI model based on the audio data sets 1a, 1b, and 2, or a combination of the image data sets 1a, 1b, and 2 and the audio data sets 1a, 1b, and 2. The system 300 includes a client device 1, a client device 2, a client device 3, and the server system 106. An example of the client device 1 includes the eyeglass 218, or a combination of the eyeglass 218 and the camera 216 (FIG. 2A), or a combination of the eyeglass 218 and the game console 214 (FIG. 2A), or a combination of the eyeglass 218, the camera 216, and the game console 214. An example of the client device 2 includes the eyeglass 256 (FIG. 2B).

The server system 106 includes the game engine and the inferred training engine 108, which is sometimes referred to herein as an AI processor system. The game engine is used to execute the game. For example, the game engine includes game code to implement laws of physics to impart the physical parameters in the game or generate a state of a virtual object in the game or generate the graphical parameters of the virtual object. Also, the game code is executed to apply graphical parameters to one or more virtual objects of the game. The game engine is coupled to the inferred training engine 108.

The inferred training engine 108 includes an AI processor and a memory device 302. The AI processor is an example of any of the processors of the server system 106 and the memory device 302 is an example of any of the memory devices of the server system 106. The AI processor is coupled to the memory device 302. Within the memory device 302, input data sets 1a, 1b, and 2 are stored after being received from the eyeglasses 218 and 256 (FIGS. 2A and 2B). The input data set 1a includes an image data set 1a or an audio data set 1a or a combination thereof. The input data set 1b includes an image data set 1b or an audio data set 1b or a combination thereof, and the input data set 2 includes an image data set 2 or an audio data set 2 or a combination thereof. The AI processor stores the image data sets 1a, 1b, and 2 and the audio data sets 1a, 1b, and 2 in the memory device 302. As an example, the image data set 1b is received from the eyeglass 218 or a combination of the camera 216 (FIG. 2A) and the eyeglass 218.

The AI processor includes a feature extractor, a classifier, and an AI model. For example, the AI processor includes a first integrated circuit that applies functionality of the feature extractor, a second integrated circuit that applies functionality of the classifier, and a third integrated circuit that applies functionality of the AI model. As another example, the AI processor executes a first computer program to apply the functionality of the feature extractor, a second computer program that applies the functionality of the classifier, and a third computer program that applies the functionality of the AI model. The feature extractor is coupled to the classifier, which is coupled to the AI model. The AI model is an example of the material identification system 110 (FIG. 1).

The feature extractor extracts, such as determines, audio parameters, such as one or more amplitudes or one or more frequencies or a combination thereof, from the audio data sets 1a, 1b, and 2, and provides the audio parameters to the classifier. For example, the feature extractor determines magnitudes or peak-to-peak amplitudes or zero-to-peak amplitudes of the audio data sets 1a, 1b, and 2 and frequencies of the audio data sets 1a, 1b, and 2. To illustrate, the feature extractor determines an absolute maximum power of an audio data set m, such as 1a, or 1b, or 2, or an absolute minimum power of the audio data set m to determine a magnitude of the audio data set m. In the illustration, an absolute power is a magnitude within an entire time period for which the audio data set m is generated. As another illustration, the feature extractor determines a local maximum magnitude of the audio data set m and a local minimum magnitude of the audio data set m. In the illustration, a local magnitude is a magnitude within a pre-determined time period and the pre-determined time period is less than the entire time period for which the audio data set m is generated. In the illustration, multiple local maximum magnitudes and multiple local minimum magnitudes are determined from the audio data set m, and a best fit or an average or a median is applied by the feature extractor to the local maximum magnitudes and the local minimum magnitudes to determine a maximum magnitude and a minimum magnitude.

As another illustration, the feature extractor determines a first time at which the audio data set m reaches a pre-determined magnitude and a second time at which the audio data set m reaches the same pre-determined magnitude, and calculates a difference between the first and second times to determine a time interval. The feature extractor inverts the time interval to determine an absolute frequency of the audio data set m. In the illustration, the absolute frequency is a frequency within the entire time period for which the audio data set m is generated. In the illustration, the feature extractor determines the absolute frequency to be a frequency of the audio data set m. As yet another illustration, the feature extractor determines a local frequency of the audio data set m. In the illustration, a local frequency is a frequency within a pre-determined time period and the pre-determined time period is less than the entire time period for which the audio data set m is generated. In the illustration, multiple local frequencies are determined from the audio data set m, and a best fit or an average or a median is applied by the feature extractor to the local frequencies to determine a frequency of the audio data set m. In the illustration, each local frequency is determined in the same manner in which the absolute frequency is determined except the local frequency is determined for each pre-determined time period. As yet another illustration, the feature extractor determines a frequency of the audio data set m to be a maximum frequency. The maximum frequency is a maximum among all frequencies that are determined from the audio data set m within a pre-determined time period. As still another illustration, the feature extractor determines a frequency of the audio data set m to be a minimum frequency. The minimum frequency is a minimum among all frequencies that are determined from the audio data set m within a pre-determined time period.

The classifier receives the audio parameters from the feature extractor, and classifies the audio parameters obtained from the audio data sets 1a, 1b, and 2. The audio parameters are classified to output associations between the audio parameters, the types of materials of the seats used within the systems 200 and 250, and the types of materials of covers of the seats, and the associations are provided from the classifier to the AI model to train the AI model. For example, one or more of the processors of the server system 106 generates the list 270 (FIG. 2C) upon determining that the feature extractor has generated the audio parameters from the audio data sets 1a and 1b, and sends the list 270 via the computer network to the eyeglass 218 worn by the user 1. To illustrate, the list 270 is sent from the server system 106 to the eyeglass 218 within a pre-determined time period after which the audio parameters are generated from the audio data sets 1a and 1b. In the example, when the types of materials received within the list 270 are received from the eyeglass 218 via the computer network, the classifier associates, such as establishes a one-to-one correspondence or a link or a unique relationship, between a first set of the types of materials of the seats and the seat covers within the system 200 and a second set of the audio parameters determined from the audio data sets 1a and 1b. It should be noted that as an example, the list 270 excludes the types of materials of the covers of the seats 202A and 204A when the seats 202A and 204A do not include the covers. To illustrate, the first set includes the types of materials of the seats 202A and 204A without including the types of materials of the covers of the seats 202A and 204A. It should further be noted that as another example, the system 200 excludes the seat 204A. In the example, the first set includes the type of material of the seat 202A and excludes the type of material of the seat 204A. Also, in the example, the audio data set 1a is received without receiving the audio data set 1b, and the audio parameters are determined from the audio data set 1a. It should be noted that in any of the previous examples in this paragraph, the types of materials of the seat 202A and the cover of the seat 202A of the system 200 are examples of types 1ax and 1ay, and the types of materials of the seat 204A and the cover of the seat 204A of the system 200 are examples of types 1bx and 1by. For example, the type of material of the seat 202A is an example of the type 1ax and the type of material of the cover of the seat 202A is an example of the type 1ay. As another example, the type of material of the seat 204A is an example of the type 1bx and the type of material of the cover of the seat 204A is an example of the type 1by. Each type 1ax, 1ay, 1bx, and 1by is an example of an output parameter.

As another example, one or more of the processors of the server system 106 generates the list 280 (FIG. 2D) in response to determining that the feature extractor has generated the audio parameters from the audio data set 2, and sends the list 280 via the computer network to the eyeglass 256 (FIG. 2B) worn by the user 3. To illustrate, the list 280 is sent within a pre-determined time period after which the audio parameters are generated from the audio data set 2. In the example, when the types of materials received within the list 280 are received from the eyeglass 256 via the computer network, the classifier associates, such as establishes a one-to-one correspondence or a link or a unique relationship, between a third set of the types of materials of the seats and the seat covers within the system 250 and a fourth set of the audio parameters determined from the audio data set 2. It should be noted that as an example, the list 280 excludes the types of materials of the covers of the seats 254A, 254B, and 254C when the seats 254A, 254B, and 254C do not include the covers. In the example, the third set includes the types of materials of the seats 254A, 254B, and 254C without including the types of materials of the covers of the seats 254A, 254B, and 254C. It should be noted that in any of the previous examples in this paragraph, the types of materials of the seats 254A, 254B, and 254C and the covers of the seats 254A, 254B, and 254C of the system 250 are examples of types 2x and 2y. For example, the type of material of the seat 254A, 254B, or 254C is an example of the type 2x, and the type of material of the cover of the seat 254A, 254B, or 254C is an example of the type 2y. Each type 2x and 2y is an example of an output parameter.

The AI model is trained based on the associations between the input data sets 1a, 1b, and 2, such as the audio parameters and the image data sets 1a, 1b, and 2, associated with the systems 200 and 250 (FIGS. 2A and 2B). For example, the AI model is provided with the association between the first set of the audio parameters generated from the audio data sets 1a and 1b and the second set of the types of the materials of the seats 202A and 204A and covers of the seats 202A and 204A. As another example, the AI model is provided with the association between the first set of the audio parameters generated from the audio data sets 1a and 1b, and the second set of the types of the materials of the seats 202A and 204A. As yet another example, the AI model is provided with the association between the first set of the audio parameters generated from the audio data set 1a and the second set of the types of the materials of the seat 202A and the cover of the seat 202A. As still another example, the AI model is provided with the association between the first set of the audio parameters generated from the audio data set 1a and the second set of the type of the material of the seat 202A.

As another example, the AI model is provided with the association between the third set of the audio parameters generated from the audio data set 2 and the fourth set of the types of the materials of the seats 254A through 254C and covers of the seats 254A through 254C. As another example, the AI model is provided with the association between the third set of the audio parameters generated from the audio data set 2 and the fourth set of the types of the materials of the seats 254A through 254C.

In one embodiment, the image data sets 1a, 1b and 2 are received by the server system 106 from the client devices 1 and 2 via the computer network. In the embodiment, the image data sets 1a, 1b, and 2 are used in conjunction with the audio data sets 1a, 1b, and 2 to facilitate training of the AI model. For example, the feature classifier identifies real-world objects within the systems 200 and 250 from the image data sets 1a, 1b, and 2, and further determines the physical and graphical parameters of the real-world objects. To illustrate, the feature classifier compares a size and shape of an image of a first seat, such as the seat 202A or 204A, received within a first image data set, such as the image data set 1a or 1b, with a pre-stored size and a pre-stored shape of a pre-stored seat to determine or identify that the first seat is a seat of an office chair. In the illustration, the pre-stored size, the pre-stored shape, and an identification of the pre-stored seat are stored in the memory device 302. In the illustration, the identification of the pre-stored seat includes alphanumeric characters. Also, in the illustration, the feature classifier extracts or identifies the physical parameters, such as motion or a change in position and orientation, of the first seat from the first image data set. In the illustration, the feature classifier determines a change of motion of the first seat from a first position to a second position and from a first orientation to a second orientation or a combination thereof. In the illustration, the change of motion of the first seat occurs when the first seat compresses or decompresses due to interaction by a first user, such as the user 1 or 2, with the first seat. Further, in the illustration, the feature classifier extracts or identifies the graphical parameters, such as intensities or colors or shades or textures, of the first seat from the first image data set as the first seat changes its position and orientation. In the illustration, the feature extractor provides the identity of the first seat, the physical parameters of the first seat, and the graphical parameters of the first seat within the system 200 to the classifier to facilitate training of the AI model. In the illustration, the classifier associates, such as establishes a one-to-one relationship or a unique relationship or a link between a set that includes an identity of the first seat, the audio parameters determined based on sounds generated by interaction of the first user with the first seat, the physical parameters of the first seat, and the graphical parameters of the first seat and a set that includes the type of material of the first seat and the type of material of the cover of the first seat to output an association. In the illustration, the association is provided from the classifier to the AI model to train the AI model.

It should be noted that the physical parameters of the seat 202A from the first image data set is sometimes referred to herein as physical parameters PP1$a$ and the physical parameters of the seat 204A from the first image data set is sometimes referred to herein as physical parameters PP2$a$. It should also be noted that the graphical parameters of the seat 202A from the first image data set is sometimes referred to herein as graphical parameters GP1$a$ and the graphical parameters of the seat 204A from the first image data set is sometimes referred to herein as graphical parameters GP2$a$. To illustrate, the graphical parameters GP1$a$ include a first set of graphical parameters when the seat 202A is at a first position and orientation and a second set of graphical parameters when the seat 202A is at a second position and orientation. In the illustration, the first set includes a different amount of light, intensity, shade, color, texture, or a combination thereof compared to an amount of light, intensity, shade, color, texture, or a combination thereof of the second set.

As another illustration, the feature classifier compares a size and shape of an image of a second seat, such as the seat 254A or 254B or 254C, received within a second image data set, such as the image data set 2, with a pre-stored size and a pre-stored shape of a pre-stored seat to determine that the second seat is a seat of a bus chair. In the illustration, the pre-stored size, the pre-stored shape, and an identification of the pre-stored seat are stored in the memory device 302. In the illustration, the identification of the pre-stored seat includes alphanumeric characters. Also, in the illustration, the feature classifier extracts or identifies the physical parameters, such as motion or a change in position and orientation, of the second seat from the second image data set. In the illustration, the feature classifier determines a motion of the second seat from a third position to a fourth position and from a third orientation to a fourth orientation. In the illustration, the change of motion of the second seat occurs when the second seat compresses or decompresses due to interaction by a second user, such as the respective user 3, 4, or 6, with the second seat. Further, in the illustration, the feature classifier extracts or identifies the graphical parameters, such as intensities or colors or shades or textures, of the second seat from the second image data set as the second set changes its position and orientation due to interaction by the second user. In the illustration, the feature extractor provides the identity of the second seat, the physical parameters of the second seat, and the graphical parameters of the second seat within the system 250 to the AI model to train the AI model. In the illustration, the classifier associates, such as establishes a one-to-one relationship or a unique relationship or a link between a set that includes an identity of the second seat, the audio parameters determined based on sounds generated by interaction of the second user with the second seat, the physical parameters of the second seat, and the graphical parameters of the second seat and a set that includes the type of material of the second seat and the type of material of the cover of the second seat to output an association. In the illustration, the association is provided from the classifier to the AI model to train the AI model.

It should be noted that the physical parameters of the seat 254A or 254B or 254C from the second image data set is sometimes referred to herein as physical parameters PP2. It should also be noted that the graphical parameters of the seat 254A or 254B or 254C from the second image data set is sometimes referred to herein as graphical parameters GP2. It should further be noted that an identity of the seat 254A or 254B or 254C is sometimes referred to herein as the identity I2.

In some embodiments, communication between the server system 106 and the client devices 1-3 may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in a client device, converted by an analog-to-digital converter of the client device, and transmitted as a stream of bits to a cell. All the 5G wireless devices in the cell communicate by radio waves with a local antenna array and low power automated transceiver (transmitter and receiver) in the cell, over frequency channels assigned by the transceiver from a pool of frequencies that are reused in other cells. The local antenna array is connected with the cellular network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, to train the AI model, one or more of processors 1 through P (FIG. 5) determines an error between an output of the AI model, such as type of materials, and the output parameters, such as ground truth material types. One or more of the processors 1 through P back propagate the error to adjust the AI model. In the embodiment, the output parameters are not used as inputs to the AI model and instead are used as inputs to the determination of the error of the AI model. Also, in the embodiment, the error is not used as an input to the AI model. Rather, the error is used by the one or more of the processors 1 through P to modify, such as change weights, of the AI model.

FIG. 3B is a diagram of an embodiment of a table 350 to illustrate associations 352*a*, 352*b*, and 354. The associations 352a, 352b, and 354 are formed between a set that includes the audio data sets 1a, 1b, 2 and multiple audio parameters AP1a, AP1b, and AP2, and a set that includes the identities I1a, I1b, and I2, the types 1ax, 1bx, and 2x of materials of the seats 202A, 204A, 254A, 254B, and 254C and types 1ay, 1by, and 2y of materials of covers of the seats 202A, 204A, 254A, 254B, and 254C of the systems 200 and 250 (FIGS. 2A and 2B). The audio parameters AP1a represent the audio parameters that are determined by the feature classifier from the audio data set 1a. The audio data set 1a is generated based on the sounds received from the interaction of the user 1 with the seat 202A (FIG. 2A). Also, the audio parameters AP1b represent the audio parameters that are determined by the feature classifier from the audio data set 1b. The audio data set 1b is captured based on the sounds received from the interaction of the user 2 with the seat 204A (FIG. 2A). The audio parameters AP2 represent the audio parameters that are determined by the feature classifier based on the audio data set 2. The audio data set 2 is generated based on sounds received from the interaction of the user 3 with the seat 254B (FIG. 2B) or the user 6 with the seat 254A (FIG. 2B) or the user 4 with the seat 254C (FIG. 2B) or a combination thereof.

The material type 1ax is a type of material of the seat 202A and the material type 1ay is a type of material of the cover of the seat 202A, and the types 1ax and 1ay are received as a portion of the input data set 1a (FIG. 3A) from the user 1 via the user account 1. For example, the material types 1ax and 1ay are received within the list 270 (FIG. 2C) from the user 1. Similarly, the material type 1bx is a type of material of the seat 204A and the material type 1by is a type of material of the cover of the seat 204A, and the types 1bx and 1by are received as a portion of the input data set 1b (FIG. 3A) from the user 1 via the user account 1. As an example, the material types 1bx and 1by are received within the list 270 from the user 1. Also, the material type 2x is a type of material of any of the seats 254A, 254B, and 254C and the material type 2y is a type of material of the cover of any of the seats 254A, 254B, and 254C. The material types 2x and 2y are received as a portion of the input data set 1b (FIG. 3A) from the user 3 via the user account 3. As an example, the material types 2x and 2y are received within the list 280 (FIG. 2D) from the user 3 via the user account 3.

The association 352a is a unique relationship between a set that includes the audio data set 1a, the audio parameters AP1a and a set that includes the identity I1a and the material types 1ax and 1ay. Similarly, the association 352b is a unique relationship between a set that includes the audio data set 1b, the audio parameters AP1b and a set that includes the identity I1b and the material types 1bx and 1by. Also, the association 354 is a one-to-one relationship between a set that includes the audio data set 2, the audio parameters AP2 and a set that includes the identity I2 and the material types 2x and 2y.

In one embodiment, the table 350 excludes the material types 1ay, 2ay, and 2y of the covers of the seats of the systems 200 and 250. This is in case the seats of the systems 200 and 250 do not have the covers or the material types 1ay, 2ay, and 2y are not received from the users 1 and 3 via the respective user accounts 1 and 3.

FIG. 3C is a diagram of an embodiment of a table 360 to illustrate associations 362a, 362b, and 364. The associations 362a, 362b, and 364 are formed between a set that includes the audio data sets 1a, 1b, and 2, the multiple audio parameters AP1a, AP1b, and AP2, the image data sets 1a, 1b, and 2, the physical parameters PP1a, PP1b, and PP2, the graphical parameters GP1a, GP1b, and GP2, and a set that includes the identities I1a, I1b, and I2, the types 1ax, 1bx, and 2x of materials of the seats 202A, 204A, 254A, 254B, and 254C and the types 1ay, 1by, and 2y of materials of covers of the seats of the systems 200 and 250 (FIGS. 2A and 2B).

The association 362a is a unique relationship between a set that includes the audio data set 1a, the audio parameters AP1a, the physical parameters PP1a, and the graphical parameters GP1a and a set that includes the identity I1a and the material types 1ax and 1ay. Similarly, the association 362b is a unique relationship between a set that includes the audio data set 1b, the audio parameters AP1b, the physical parameters PP1b, and the graphical parameters GP1b and a set that includes the identity I1b and the material types 1bx and 1by. Also, the association 364 is a one-to-one relationship between a set that includes the audio data set 2, the audio parameters AP2, the physical parameters PP2, and the graphical parameters GP2 and a set that includes the identity I2 and the material types 2x and 2y.

In one embodiment, the table 360 excludes the material types 1ay, 2ay, and 2y of the covers of the seats 202A, 204A, 254A, 254B, and 254C of the systems 200 and 250. This is in case the seats of the systems 200 and 250 do not have the covers or the material types 1ay, 2ay, and 2y are not received from the users 1 and 3 via the respective user accounts 1 and 3.

FIG. 4A is a diagram of an embodiment of a system 400 to illustrate a method for determining a probability of N % that a material of a seat 402A is of the type 1ax and a probability of M % that a material of a cover of the seat 402A is of the type 1ay, where M and N are real numbers. The types 1ax and 1ay are examples of output parameters. The system 400 is an example of the environment 120 (FIG. 1). The system 400 includes a chair 402 having the seat 402A, a user 7, the AI model, a table 404, a virtual chair 408 having a virtual seat 408A, and a virtual user 416. The user 7 is wearing an eyeglass 410 having a microphone M3 and a camera C3. The eyeglass 410 is an example of the client device 3 (FIG. 3A).

The eyeglass 410 is coupled to the server system 106 via the computer network. For example, the eyeglass 410 is coupled to the server system 106 (FIG. 1) via a game console (not shown) and the computer network. As another example, the eyeglass 410 is directly coupled to the server system 106 via the computer network without using the game console (not shown).

The microphone M3 is an example of the sound capture system 104 (FIG. 1). The camera C3 is an example of the images capture system 104 (FIG. 1). The camera C3 is attached to a bottom surface of a rim of the eyeglass 410. For example, a field-of-view of the camera C3 faces down towards a floor of a real-world environment, such as a room, in which the eyeglass 410 is situated. The eyeglass 410 is coupled to an input controller 414 via a wired or a wireless connection.

The microphone M3 detects sounds that are emitted from the real-world environment in which the user 7 is located. For example, as the user 7 stands up from the seat 402A or sits down on the seat 402A, a noise is created and the noise is detected by the microphone M3 to capture an audio data set p, where p is an integer. The audio data set p is sent from the eyeglass 410 via the computer network to the server system 106 (FIG. 1). The feature extractor of the one or more processors of the server system 106 extracts audio parameters APp from the audio data set p. For example, the feature extractor extracts the audio parameters APp from the audio data set APp in the same manner in which the audio parameters AP1*a* are obtained from the audio data set 1*a* or the audio parameters AP1*b* are obtained from the audio data set 1*b*.

The one or more processors of the server system 106 store the audio parameters APp and the audio data set p in the one or more memory devices of the server system 106. The audio parameters APp are provided from the feature extractor to the AI model. Upon receiving the audio parameters APp, the AI model determines the probability of N % that a material of the seat 402A is of the type 1*ax* and the probability of M % that a material of the cover of the seat 402A is of the type 1*ay*. For example, upon determining that the audio parameters APp are within a pre-determined range from the audio parameters AP1*a* and outside the pre-determined range from the audio parameters AP1*b* or AP2, the AI model indicates that there is a greater than 50% probability that the audio data set APp is generated based on sounds that are reflected from the seat 402A that is made from the same material as that of the seat 202A (FIG. 2A) and there is a greater than 50% that the audio data set APp is generated based on sounds that are reflected from the cover of the seat 402A that is made from the same material as that of the cover of the seat 202A (FIG. 2A). In the example, the probability that the seat 402A is made from the same material as that of the seat 202A (FIG. 2A) and the probability that the cover of the seat 402A is made from the same material as that of the cover of the seat 202A are examples of a model output 412. The model output 412 is an output of the AI model.

To illustrate, upon determining that a maximum amplitude of the audio parameters APp is within a pre-determined range from a maximum amplitude of the audio parameters AP1*a* and outside the pre-determined range from a maximum amplitude of the audio parameters AP1*b* or outside the pre-determined range from a maximum amplitude of the audio parameters AP2, the AI model indicates that there is a greater than 50% probability that the seat 402A has the same material as that of the seat 202A and there is a greater than 50% probability that the cover of the seat 402A has the same material as that of the cover of the seat 202A. As another illustration, upon determining that a frequency of the audio parameters APp is within a pre-determined range from a frequency of the audio parameters AP1*a* and outside the pre-determined range from a frequency of the audio parameters AP1*b* or outside the pre-determined range from a frequency of the audio parameters AP2, the AI model indicates that there is a greater than 50% probability that the seat 402A has the same material as that of the seat 202A and there is a greater than 50% probability that the cover of the seat 402A has the same material as that of the cover of the seat 202A. As another illustration, upon determining that a maximum amplitude of the audio parameters APp is within a first pre-determined range from a maximum amplitude of the audio parameters AP1*a* and outside the first pre-determined range from a maximum amplitude of the audio parameters AP1*b* or outside the first pre-determined range from a maximum amplitude of the audio parameters AP2 and a frequency of the audio parameters APp is within a second pre-determined range from a frequency of the audio parameters AP1*a* and outside the second pre-determined range from a frequency of the audio parameters AP1*b* or outside the second pre-determined range from a frequency of the audio parameters AP2, the AI model indicates that there is a greater than 50% probability that the seat 402A has the same material as that of the seat 202A and there is a greater than 50% probability that the cover of the seat 402A has the same material as that of the cover of the seat 202A.

Moreover, in the example, the user 7 selects one or more buttons on the input controller 414 to provide an indication to the eyeglass 410 to display a virtual image of the virtual seat 408A that is similar to the seat 402A and a virtual image of the virtual user 416. As an example, the virtual user 416 is a character in the game or an avatar that is controlled by the user 7 during a play of the game. To illustrate, the virtual seat 408A is similar to the seat 402A when the virtual seat 408A has the same material, or same physical parameters, same audio parameters, or the same graphical parameters, or a combination thereof as that of the seat 402A.

In the example, upon receiving the indication, the eyeglass 410 sends the indication via the computer network to the one or more processors of the server system 106. In the example, upon receiving the indication to display the virtual image of the virtual seat 408A that is similar to the seat 402A from the eyeglass 410, the AI model of the one or more processors of the server system 106 computes or determines or has already computed or determined the model output 412, which indicates that the seat 402A has the probability of N % that the seat 402A has the same material as that of the seat 202A and has the probability of M % that the cover of the seat 402A has the same material as that of the seat 202A.

Further, in the example, after determining the model output 412 and receiving the indication from the eyeglass 410 to display the virtual image of the virtual seat 408A that is similar to the seat 402A or 202A, the one or more processors of the server system 106 determine to output the audio parameters AP1*a* of the seat 202A based on which the probabilities M % and N % are determined. In addition, in the example, the one or more processors of the server system 106 determine to display the graphical parameters GP1*a* and the physical parameters PP1*a* of the seat 202A, and determine to display the graphical parameters GP1*a* according to the physical parameters PP1*a*. To illustrate, when the physical parameters PP1*a* indicate that the virtual seat 408A is to be displayed at the first position and orientation, the first set of graphical parameters are to be assigned to the virtual seat 408A and when the physical parameters PP1*a* indicate that the virtual seat 408A is to be displayed at the second position and orientation, the second set of graphical parameters are to be assigned to the virtual seat 408A.

Also, in the example, upon receiving the indication, the one or more processors of the server system generate virtual image data for displaying an image of the virtual user 416. In the example, the one or more processors of the server system determine how the virtual seat 408A is to move based on movement of the virtual user 416. To illustrate, when the virtual user 416 is to be displayed as sitting down on the seat 408A, the virtual seat 408A is to be displayed as being compressed according to the same physical parameters PP1*a*, the same audio parameters AP1*a*, and the same graphical parameters GP1*a* with which the seat 202A compresses when the user 1 sits on the seat 202A. As another illustration, when the virtual user 416 is to be displayed as standing up from the seat 408A, the virtual seat 408A is to be displayed as being decompressed according to the same physical parameters PP1*a*, the same the audio parameters AP1*a*, and the same graphical parameters GP1*a* with which the seat 202A decompresses when the user 1 stands up from the seat 202A. In the example, the one or more processors of the server system 106 accesses the audio parameters AP1*a*, the graphical parameters GP1*a*, the physical parameters PP1*a*, and the virtual image data for displaying the image of the virtual user 416 from one or more of the memory devices of the server system 106 and send the audio parameters AP1*a*, the graphical parameters GP1*a*, the physical parameters PP1*a*, and the virtual image data via the computer network to the eyeglass 410.

Further, in the example, the CPU of the eyeglass 410 receives the audio parameters AP1*a*, the graphical parameters GP1*a*, the physical parameters PP1*a*, and the virtual image data for displaying the image of the virtual user 416, and controls the GPU of the eyeglass 410 to display the virtual chair 408 as having the virtual seat 408A, which has the graphical parameters GP1*a* change according to a change in the physical parameters PP1*a*. Also, in the example, the CPU of the eyeglass controls the GPU of the eyeglass to display the virtual user 416 as sitting down on the virtual seat 408A or standing up from the virtual seat 408A. Also, in the example, the CPU of the eyeglass 410 controls a sound output system of the eyeglass 410 to output sounds according to the audio parameters AP1*a*. To illustrate, the CPU of the eyeglass 410 controls the GPU of the eyeglass 410 to display the virtual seat 408A as compressing or decompressing based on the physical parameters PP1*a*. In the illustration, the GPU of the eyeglass 410 displays the virtual seat 408A as having the intensities, colors, and textures as those indicated in the graphical parameters GP1*a*. Further, in the illustration, as the virtual seat 408A is displayed as being compressed and decompressed according to the physical parameters PP1*a*, the CPU controls the sound output system of the eyeglass 410 to output sounds of the compression and the decompression.

In one embodiment, each input data set, described herein, includes light detection and ranging (LiDAR) data. For example, a LiDAR scanner is used in the system 200 to capture LiDAR data 1*a*, which is sent to the server system 106 in the same manner in which the image data 1*a* is sent from the camera C1 to the server system 106. To illustrate, the LiDAR scanner is implemented within the eyeglass 218 and the LiDAR data 1*a* includes LiDAR images of the seat 202A. Also, a LiDAR scanner is used in the system 250 to capture LiDAR data 1*b* and a LiDAR scanner is used in the system 400 to capture LiDAR data 2. To illustrate, the LiDAR scanner is implemented within the eyeglass 256, as illustrated in FIG. 2B, and the LiDAR data 1*b* includes LiDAR images of one or more of the seats 254A, 254B and 254C. Also, the LiDAR scanner is implemented within the eyeglass 410, as illustrated in FIG. 4A, and the LiDAR data 2 includes LiDAR images of the seat 402A. The LiDAR data 1*a* and 1*b* are used in the same manner in which the image data 1*a* and 1*b* are used to train the AI model. The AI model then processes the LiDAR data 2 to determine the probabilities of N % and M %.

In an embodiment, each input data set, described herein, includes inertial measurement unit (IMU) data. For example, each eyeglass, described herein, includes inertial sensors, such as magnetometers, gyroscopes, and accelerometers, that detect movement of a head of a user wearing the eyeglass. To illustrate, the movement includes positions and orientations of the head of the user. The eyeglass 218 (FIG. 2A) detects movement of the head of the user 1 while the user 1 is walking on a material of a floor of the system 200 to output an IMU data set 1*a*. In addition, the microphone M1 captures an audio data set 1*a*', which indicates sound generated by the material of the floor of the system 200 as the user 1 walks on the material. Similarly, the eyeglass 256 (FIG. 2B) detects movement of the head of the user 3 while the user 3 is walking on a material of a floor of the system 250 to output an IMU data set 1*b* and the microphone M2 captures an audio data set 1*b*' that indicates sounds generated by the material of the floor of the system 250 as the user 3 walks on the material of the floor of the system 250. The audio data sets 1*a*' and 1*b*' and the IMU data sets 1*a* and 1*b* are used to train the AI model in the same manner in which the input data sets 1*a* and 1*b* are used to train the AI model. Also, the microphone M3 captures an audio data set 2' while the user 7 walks on a material of a floor of the system 400 and inertial sensors detect movement of the head of the user 7 to output an IMU data set 2 while the user 7 walks. The audio data set 2' indicates sounds generated by the material of the floor of the system 400 as the user 7 walks on the floor of the system 400. The audio data set 2' and the IMU data set 2 are processed by the AI model to output a probability of a type of material of the floor of the system 400 in the same manner in which the input data set 2 is processed by the AI model to determine the probability of N %.

In one embodiment, the AI model determines the model output 412 before receiving the indication to display the virtual image of the seat 408A that is similar to the seat 402A.

In one embodiment, the eyeglass 410 excludes the camera C3.

In an embodiment, instead of the input controller 414, a hand-held controller is used. The hand-held controller is coupled via a wired or a wireless connection to the eyeglass 410.

In an embodiment, instead of receiving selections of one or more buttons on an input controller that is coupled to an eyeglass worn by a user, the user makes gestures. A camera of the eyeglass captures image data of the gestures. For example, the gestures are used to provide selections of types of materials of real-world objects within a system or types of materials of covers of the real-world objects. The image data is analyzed by a CPU of the eyeglass or by the one or more processors of the server system 106 to determine the types of materials of the real-world objects or the types of materials of the covers selected by the user.

FIG. 4B is a diagram of an embodiment of a system 450 to illustrate an augmented reality (AR) video game using the present methods described herein. When a hand-held controller, including a microphone, is placed on a coffee table, the hand-held controller assists to provide material estimation of the coffee table. Then, a virtual character jumping out of the hand-held controller onto the coffee table produces realistic three-dimensional (3D) audio sounds as it virtually hits the coffee table. In this instance, the estimated material, such as wood or glass, can be used to dynamically adjust sound characteristics of 3D audio produced by the virtual object interacting with the coffee table. Actual audio data of the physical interaction of the hand-held controller hitting the coffee table is used to modify the sound made by the virtual character interacting with the coffee table, so the user 7 (FIG. 4A) feels the virtual character is actually on coffee table.

The system 450 includes a view of a living room from a perspective of the user 7 wearing the eyeglass 410 (FIG. 4A). The living room is an example of the system 450 and of a real-world environment. The living room includes a coffee table 452 within a view of the user 7 via the eyeglass 410, a real video game controller 454, a virtual robot 456, and a display device 458. The virtual robot 456 is a video game character. As an example, the video game controller 454 or a combination of the video game controller 454 and the display device 458 is an example of the client device 3 (FIG. 3A). Also, as an example, the coffee table 452 has a top that is fabricated from wood or glass or another material.

The user 7 uses the video game controller 454 to log into a user account 7, which is assigned to the user 7 by the server system 106 (FIG. 3A). Once the user 7 logs into the user account 7, the game, such as the AR video game, is accessed by the eyeglass 410 from the server system 106. During a play of the game, the video game controller 454 is placed on the coffee table 452 by the user 7, which causes a sound, depicted as exemplary sound waves 460. For example, the sound waves 460 are produced due to interaction of the video game controller 454 with the coffee table 452. The sound waves 460 are captured by the microphone M3 or a combination the microphone M3 and a microphone of the video game controller 454 to generate an audio data set q, where q is an integer. The audio data set q is sent from the microphone M3 or the microphone of the video game controller 454 or a combination thereof via the Internet to the server system 106. The server system 106 processes the audio data set q in the same manner in which the audio data set p of FIG. 4A is processed to determine a probability r % that the type of material of the coffee table 452 is wood or glass, where r is a positive real number. Also, the audio data set q is stored by the one or more processors of the server system 106 in the one or more memory devices of the server system 106.

In addition, during the play of the game, the camera C3 of the eyeglass 410 captures images of the real-world environment of the system 450, and sends the images via the Internet to the server system 106. The server system 106 determines location of objects, such as the coffee table 452 and the video game controller 454, within the real-world environment of the system 450 from a reference point, such as the eyeglass 410, within the system 450. In addition, the server system 106 determines a distance between the eyeglass 410 and any point on the top of the coffee table 452 from the images of the real-world environment of the system 450.

Also, during the play of the game, after the audio data set q is processed by the server system 106 to determine the probability r %, the user 7 selects one or more buttons on the video game controller 454. Upon receiving the selections, the video game controller 454 generates input signals, which are sent from the video game controller 454 via the Internet to the server system 106. Upon receiving the input signals, the server system 106 executes the game code of the game to generate the data for displaying a virtual robot 456 as jumping out of the video game controller 454 and landing on the coffee table 452 based on the location of the coffee table 452 and the location of the video game controller 454. Also, the one or more processors of the server system 106 generate audio data to be output as sound with the virtual robot 456 landing on the coffee table 452. For example, the audio data set q is accessed from the one or more memory devices of the server system 106 to imitate the sound that is produced when the user 7 places the video game controller 454 on the coffee table 452. In the example, the audio data set q that is obtained from the eyeglass 410 and generated based on the sound of the video game controller 454 being placed on the coffee table 452 by the user 7 is accessed from the one or more memory devices of the server system 106. Further, in the example, the audio data set q is used to generate the audio data set to be output as sound at a time the virtual robot 456 lands on the coffee table 452. Also, in the example, the one or more processors of the server system 106 adjust the audio parameters of the audio data set q accessed from the one or more memory devices of the server system 106 based on a distance between the eyeglass 410 and the virtual robot 456 to be displayed on the eyeglass 410. To illustrate, the further away the virtual robot 456 is to be displayed on top of the coffee table 452 from the eyeglass 410, the one or more processor reduce a peak-to-peak amplitude of the audio data set q proportionately. Contrarily, in the illustration, the closer the virtual robot 456 is to be displayed on top of the coffee table 452 with respect to the eyeglass 410, the one or more processor increase a peak-to-peak amplitude of the audio data set q proportionately. The virtual robot 456 is a character that is controlled by the user 7 by using the video game controller 454. The one or more processors of the server system 106 send the data for displaying the virtual robot 456 as landing on the coffee table 452 and the audio data to be output as sound with the display of the virtual robot 456 via the Internet to the eyeglass 410.

Upon receiving the data for displaying the virtual robot, the GPU of the eyeglass 410 displays the virtual robot 456 to be on top of the coffee table 452 within the view of the living room presented by the eyeglass 410. For example, the GPU of the eyeglass 410 displays the virtual robot 456 as landing on top of the coffee table 452. Also, the CPU of the eyeglass 410 receives the audio data from the server system 106 via the Internet. When the virtual robot 456 lands on the coffee table 452, the CPU of the eyeglass 410 controls the sound output system of the eyeglass 410 to generate a sound, depicted as sound waves 462, that is output by speakers of the eyeglass 410. The sound is output based on the audio data received from the server system 106. As such, a simulation indicating that the virtual robot 456 generates the sound waves 462 as it lands on the coffee table 452 is generated on the eyeglass 410. It should be understood, that the current techniques described herein provides a method for the virtual robot 456 to react in a perceptually natural manner to the user 7, such that the virtual robot 456 appears to interact with the coffee table 452. Examples of the interaction includes outputting a realistically appropriate 3D sound from the sound output system of the eyeglass 410, such that the sound appears to come from the same physical location on the coffee table 452 as the visual representation of the virtual robot 456 presented by the eyeglass 410, and further includes adjustment to the virtual physics properties being applied to the virtual robot 456, such that the landing motion and animation of the virtual robot 456 appears real and natural and is substantially different from the landing motion and animation of the virtual robot 456 landing and potentially bouncing on a different physical surface, such as the seat 204A or 202A as shown in FIG. 2A. Therefore, it should be understood that the system and methods described herein may be used to alter a video game application as illustrated in FIG. 4B, to provide more realistic and immersive AR entertainment.

In one embodiment, upon determining that the virtual robot 456 is to interact with the coffee table 452, haptic feedback is provided via the video game controller 454 to the user 7. For example, upon determining that the virtual robot 456 is to interact with the coffee table 452, one or more of the processors 1 through P (FIG. 5) generate and send haptic feedback data via a computer network 504 (FIG. 5) to a haptic feedback device, such as an eccentric rotating mass (ERM) actuator or a piezoelectric actuator, located within the video game controller 454. In addition, the one or more processors 1 through P send an indication via the computer network 504 to the video game controller 454 to output haptic feedback during a time period in which the virtual robot 456 is displayed to interact with, such as land on or move on, the coffee table 452. Upon receiving the haptic feedback data, the haptic feedback device vibrates to provide haptic feedback regarding the interaction to the user 7, who is holding the video game controller 454. The video game controller 454 or the input controller 414 is an example of a body connected device.

In an embodiment, the haptic feedback is provided via the eyeglass 410 or another body connected device to the user 7. For example, the eyeglass 410 includes the haptic feedback device. In the example, the one or more processors 1 through P generate and send haptic feedback data via the computer network 504 to the haptic feedback device of the eyeglass 410 or the other body connected device. Further, in the example, the one or more processors 1 through P send an indication via the computer network 504 to the eyeglass 410 or the other body connected device to output haptic feedback during a time period in which the virtual robot 456 is displayed to interact with the coffee table 452. In response to receiving the haptic feedback data, the haptic feedback device of the eyeglass 410 or the other body connected device vibrates to provide haptic feedback regarding the interaction to the user 7.

Figure 5:
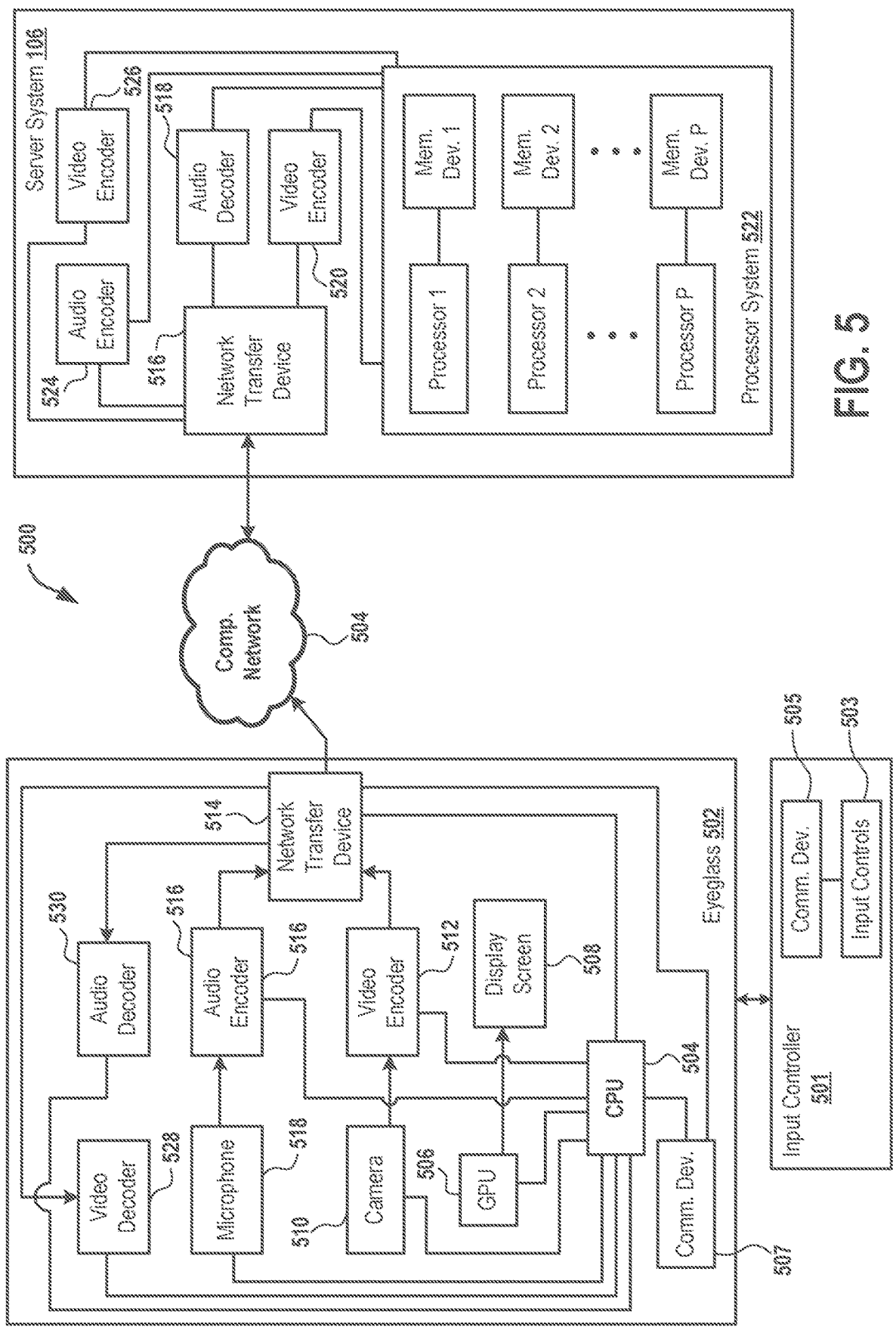
FIG. 5 is a diagram of an embodiment of a system to illustrate communication between an eyeglass and a server system via a computer network.

FIG. 5 is a diagram of an embodiment of a system 500 to illustrate communication between an eyeglass 502 and the server system 106 via the computer network 504. The system 500 includes the eyeglass 502, the computer network 504, the server system 106, and an input controller 501. Examples of an input controller, as used herein, include a hand-held controller, such as a game controller. To illustrate, the game controller is an input device used with a video game. In the illustration, one or more selections are made on the game controller by a user to control an object or a character in the video game. The eyeglass 502 is an example of the eyeglass 218 (FIG. 2A), the eyeglass 256 (FIG. 2B), or the eyeglass 410 (FIG. 4A). An example of the eyeglass 502 is an AR glass or an HMD. Examples of the computer network 504 include a wide area network (WAN), such as the Internet, a local area network (LAN), such as the Intranet, and a combination thereof.

The eyeglass 502 includes a CPU 504, a GPU 506, a display screen 508, a camera 510, a video encoder 512, a network transfer device 514, an audio encoder 516, a microphone 518, a communication device 507, a video decoder 528, and an audio decoder 530. Examples of the CPU 502 include a processor, an ASIC, and a PLD. Examples of the GPU 506 includes a processor, an ASIC, and a PLD. Examples of the display screen 508 include a liquid crystal display (LCD), a light emitting diode (LED) display, and a plasma display. The camera 510 is an example of any of the cameras C1, C2, and C3. An example of a video encoder, as used herein, is a circuit that applies a video conversion protocol, such as, a video encoding protocol, to an image data set to output encoded image data set, such as encoded image frames. To illustrate, the video encoder 512 generates I, P, or B frames, which are examples of the encoded image frames. Examples of the video encoding protocol include H.262, H.263, and H.264. The microphone 518 is a device that converts sound energy into audio data sets.

An example of an audio encoder, as used herein, is a circuit that compresses an audio data set into an encoded audio data set, such as encoded audio frames. To illustrate, the audio encoder applies an audio encoding protocol, such as lossless compression or lossy compression, to encode an audio data set into the encoded audio frames. An example of the lossy compression includes modified discrete cosine transform (MDCT) to convert time domain sampled waveforms into a frequency domain. Another example of the lossy compression is linear predictive coding (LPC) protocol that analyzes an audio data set.

An example of a network transfer device, as used herein, is a network interface controller, such as a network interface card (NIC). Another example of a network transfer device is a wireless access card (WAC). The microphone 518 is an example of any of the microphones M1, M2, and M3 (FIGS. 2A, 2B, and 4).

The server system 106 includes a network transfer device 516, an audio encoder 518, a video decoder 520, a processor system 522, an audio encoder 524, and a video encoder 526. The processor system 522 includes processors 1, 2, 3, and so on until a processor P, where P is an integer. Also, the processor system 522 includes memory devices 1, 2, 3, and so on until a memory device P. As an example, a combination of the processor 1 and the memory device 1 forms a first server, a combination of the processor 2 and the memory device 2 forms a second server, and so on until a combination of the processor P and the memory device P forms a $P^{th}$ server. As another example, one or more of the processors 1 through P form the AI processor of FIG. 3A. To illustrate, one or more of the feature extractor, the classifier, and the AI model are implemented within or executed by the one or more of the processors 1 through P. The memory device 302 (FIG. 3A) is an example of any of the memory devices 1 through P.

The processors 1 through P are examples of the sound impart system 114, the physics impart system 112, and the graphics impart system 116 (FIG. 1). Each processor 1 through P of the system 522 is coupled to a corresponding memory device 1 through P of the processor system 522. For example, the processor P is coupled to the memory device P. An example of an audio decoder is a circuit that decompresses an encoded audio data set into an audio data set, such as audio frames. To illustrate, an audio decoder applies an audio decoding protocol, such as an audio decompression protocol, to decode encoded audio frames into audio frames. An example of a video decoder, as used herein, is a circuit that executes a video decoding protocol, such as H.262, H.263, or H.264 decoding or another type of video decompression, to encoded image frames to output decoded data, such as image frames.

The input controller 501 includes input controls 503 and a communication device 505. Examples of the input controls 503 include one or more buttons, a touchpad, a touchscreen, and a joystick, all of which allow a user to make selections. Examples of a communication device, as used herein, include a circuit that applies a transfer communication protocol, such as a wired communication protocol or a wireless communication protocol. Examples of the wireless communication protocol include a Bluetooth™ protocol, a near field communication protocol, a Wi-Fi™ protocol, and a radio frequency (RF) communication protocol.

The CPU 504 is coupled to other components of the eyeglass 502, such as the GPU 506, the display screen 508, the camera 510, the video decoder 512, the microphone 518, the audio encoder 516, the network transfer device 514, the communication device 507, the video decoder 528, and the audio decoder 530. The GPU 506 is coupled to the display screen 508. The camera 510 is coupled to the video encoder 512, which is coupled to the network transfer device 514. The microphone 518 is coupled to the audio encoder 516, which is coupled to the network transfer device 514. The network transfer device 514 is coupled to the computer network 504. The communication device 507 is coupled to the network transfer device 514. The network transfer device 514 is coupled to the video encoder 516, the video decoder 528 and the audio decoder 530.

Also, the network transfer device 516 of the server system 106 is coupled to the audio decoder 518, the video decoder 520, the audio encoder 524, and the video encoder 526. Also, the audio decoder 518, the video decoder 520, the audio encoder 524, and the video encoder 526 of the server system 106 are coupled to the processor system 522. For example, each of the one or more processors 1 through P is coupled to the audio decoder 518, the video decoder 520, the audio encoder 524, and the video encoder 526.

The microphone 518 generates an audio data set n, such as the audio data set 1a or 1b or 2 or p (FIGS. 3A and 4) or a combination thereof, upon detecting sounds emitted from one or more real-world objects, such as the seat 202A or 204A or 254A or 254B or 254C or 402A (FIGS. 2A, 2B and 4), in a real-world environment in which the microphone 518 is located, where n is an integer. The microphone 518 sends the audio data set n to the audio encoder 516. The audio encoder 516 applies the audio encoding protocol to the audio data set n to output an encoded audio data set, such as encoded audio frames. The audio encoder 516 sends the encoded audio data set to the network transfer device 514.

Also, the camera 510 captures an image data set n, such as the image data set 1a or 1b or 2 or a combination thereof, of the one or more real-world objects, such as the seat 202A or 204A or 254A or 254B or 254C or the office chair 202, within the real-world environment in which the camera 510 is located. The image data set n is sent from the camera 510 to the video encoder 512. The video encoder 512 applies the video encoding protocol to the image data set n to output encoded image frames, such as a combination of I frames, B frames, and P frames, and provides the encoded image frames to the network transfer device 514.

Moreover, an input data set n, such as the input data set 1a or 1b or 2 or a combination thereof, is generated by the input controls 503 when a user makes one or more selections on the input controls 503. An example of the input data set n is the list 270 or 280 (FIG. 2C or 2D). The input data set n is sent from the input controls 503 to the communication device 505 of the input controller 501. The communication device 505 applies the transfer communication protocol to the input data set n to generate transfer packets. The communication device 505 sends the transfer packets via a connection, such as a wired connection or a wireless connection, between the communication device 505 and the communication device 507 to the communication device 507 of the eyeglass 502.

The communication device 507 applies the transfer communication protocol to the transfer packets to extract the input data set n. Under control of the CPU 504, the communication device 507 sends the input data set n to the network transfer device 514.

The network transfer device 514 applies a network transfer protocol, such as a Transmission Control Protocol over Internet protocol (TCP/IP), to embed the encoded image frames received from the video encoder 512 or the encoded audio frames received from the audio encoder 516 or the input data set n received from the communication device 507 or a combination thereof to output data packets. The network transfer device 514 sends the data packets via the computer network 504 to the network transfer device 516 of the server system 106.

The network transfer device 516 of the server system 106 applies the network transfer protocol to the data packets received from the network transfer device 514 to extract the encoded audio frames or the encoded image frames or the input data set n or a combination thereof from the data packets. The network transfer device 514 sends the encoded audio frames to the audio decoder 518 and the encoded image frames to the video decoder 520. The audio decoder 518 applies the audio decoding protocol to the encoded audio frames to determine the audio data set n from the encoded audio frames and sends the audio data set n to the processor system 522. Also, the video decoder 520 applies the video decoding protocol to the encoded video frames to determine the image data set n and sends the image data set n to the processor system 522. Moreover, the input data set n is sent from the network transfer device 516 to the processor system 522.

The processor system 522 applies the feature extractor to extract the audio parameters from the audio data set n and the graphical and physical parameters from the image data set n. Moreover, the processor system 522 applies the classifier to identify associations, such as the association 352a or 352b or 354 or 362a or 362b or 364 (FIGS. 3B and 3C). An example of the associations includes a correspondence between a set that includes the audio parameters determined from the audio data sets 1a, 1b, and 2 and a set that includes the types of materials of seats and the types of materials of covers of seats received within the input data sets 1a, 1b, and 2. Another example of the associations include a unique relationship between a set that includes the audio parameters determined from the audio data sets 1a, 1b, and 2, the graphical parameters determined from the image data sets 1a, 1b, and 2, the physical parameters determined from the image data sets 1a, 1b, and 2, and a set that includes the types of materials of seats and the types of materials of covers of seats received within the input data sets 1a, 1b, and 2. The processor system 522 applies the AI model to train the AI model based on the associations. Upon receiving the audio data set p, the AI model that is trained based on the associations analyzes the audio data set p to output the model output 412 (FIG. 4A).

In one embodiment, the input controller 501 is not used with the eyeglass 502. Rather, in the embodiment, the eyeglass 502 includes an additional internal camera that faces eyes of a user who wears the eyeglass 502. The additional internal camera is coupled to the CPU 504, the video encoder 512, and the network transfer device 514. The additional internal camera captures image data based on eye gestures of a user. As an example, the eye gestures are made to select types of materials of seats and the types of materials of covers of the seats within the real-world environment in which the eyeglass 502 is located. To illustrate, the eye gestures are made to select the types of materials of seats and the types of materials of covers of the seats from the list 270 or 280. The image data captured by the additional internal camera is an example of the input data 1a or 1b or 2 (FIG. 3A). Under control of the CPU 504, the image data is sent from the additional internal camera to the video encoder 512. The video encoder 512 applies the video encoding protocol to the image data to output encoded image frames, and sends the encoded image frames to the network transfer device 514. The network transfer device 514 applies the network communication protocol to the encoded image frames to generate data packets and sends the data packets via the computer network 504 to the network transfer device 516 of the server system 106.

The network transfer device 516 also applies the network communication protocol to the data packets to extract the encoded image frames and sends the encoded image frames to the video decoder 520. The video decoder 520 applies the video decoding protocol to the encoded image frames to determine the image data captured by the additional internal camera and sends the image data to the processor system 522. One or more of the processors 1 through P analyze the image data captured by the additional internal camera to identify the eye gestures made by the user to further identify the types of materials of seats and the types of materials of covers of the seats within the real-world environment in which the eyeglass 502 is located.

Figure 6:
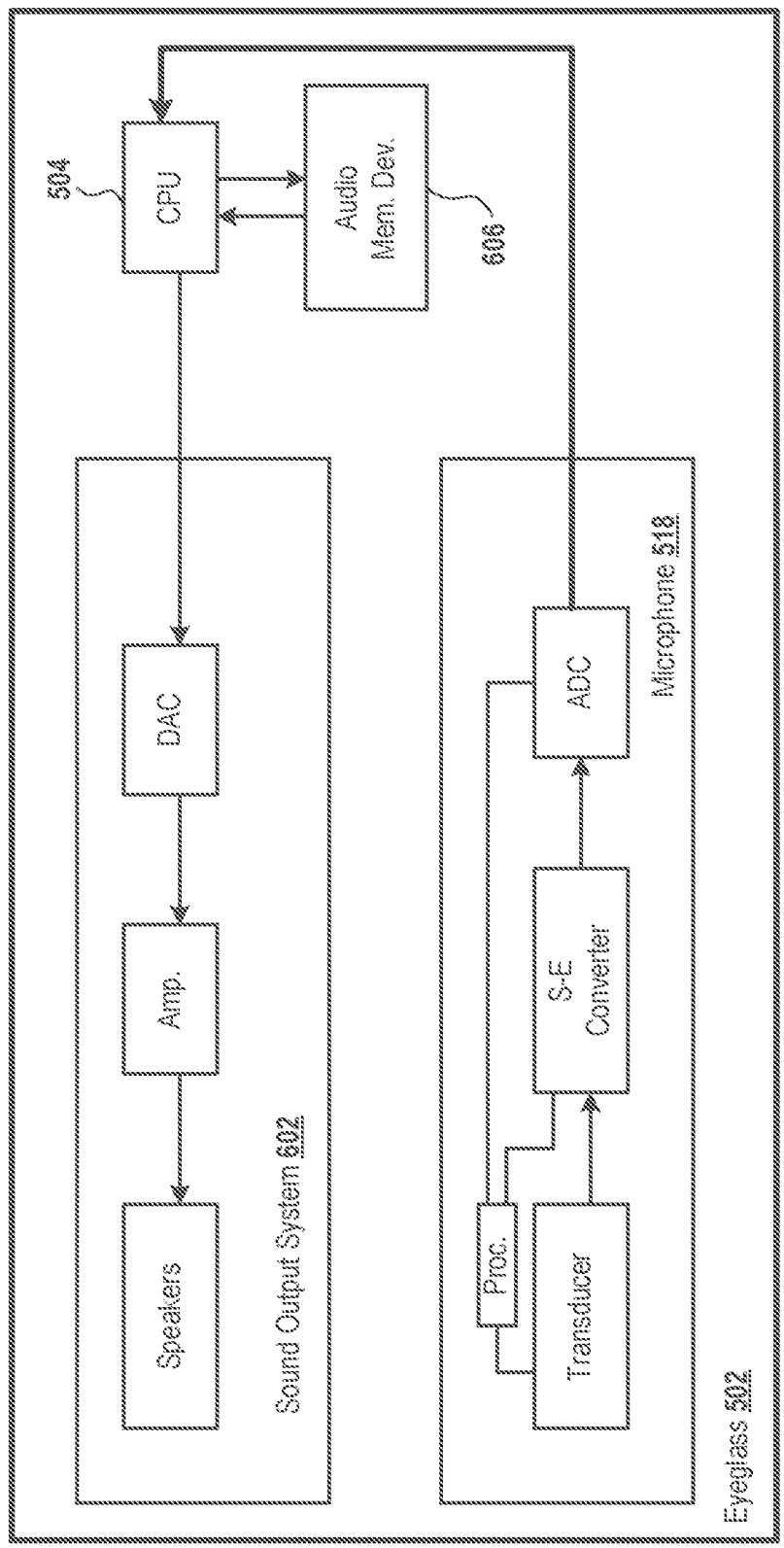
FIG. 6 is a diagram of an embodiment of the eyeglass to illustrate a sound output system and a microphone.

FIG. 6 is a diagram of an embodiment of the eyeglass 502 to illustrate a sound output system 602 and the microphone 518. The eyeglass 502 includes the CPU 504, the sound output system 602, the microphone 518, and an audio memory device 606.

The microphone 518 includes a transducer, a sound energy-to-electrical energy converter (S-E converter), an analog-to-digital converter (ADC), and a processor. The transducer is coupled to the S-E converter, which is coupled to the ADC. The processor of the microphone 518 is coupled to the transducer, the S-E converter, and the ADC. An example of the transducer is a diaphragm. An example of the S-E converter is a capacitor or a series of capacitors. The sound output system 602 includes a digital-to-analog converter (DAC), an amplifier, and speakers. The DAC is coupled to the amplifier, which is coupled to the speakers. The CPU 504 is coupled to the DAC of the sound output system 602, to the ADC of the microphone 518 and to the audio memory device 606.

The transducer detects sound that are emitted or reflected or both from real-world objects within a real-world environment, such as the system 200 or 250 or 400 (FIGS. 2A, 2B, and 4), to output vibrations. The vibrations are provided to the S-E converter to modify an electrical field generated within the S-E converter to output an audio analog signal, which is an electrical signal. The audio analog signal is provided to the ADC to convert the audio analog signal from an analog form to a digital form to output an audio data set, such as the audio data set 1$a$ or 1$b$ or 2 or p (FIGS. 3A and 4).

Upon determining to display the virtual seat 408A (FIG. 4A) of the virtual chair 408 and to output sounds according to movement of the virtual seat 408A, one or more of the processors 1 through P of the server system 106 access, such as read, the audio parameters AP1$a$, the graphical parameters GP1$a$ and the physical parameters PP1$a$ from one or more of the memory devices 1 through P. One or more of the processors 1 through P generate image frames from the graphical parameters GP1$a$ and the physical parameters PP1$a$ and generate audio frames from the audio parameters AP1$a$, and send the image and audio frames via the computer network 504 to the eyeglass 502 for display of the virtual seat 408A and output of sounds based on the movement of the virtual seat 408A. For example, one or more of the processors 1 through N receive an indication from the input controller 501 via the eyeglass 502, the computer network 504, and the network transfer device 516 that the virtual user 416 (FIG. 4A) is to be displayed as sitting on the virtual seat 408A. In the example, upon determining so, one or more of the processors 1 through N generate a series of image frames having a sequence of output of the physical parameters PP1$a$ of the virtual seat 408A to display the virtual seat 408A as rising up from a decompressed position to a compressed position, and having a sequence of output of the graphical parameters GP1$a$ of the virtual seat 408A in synchronization with the sequence of output of the physical parameters PP1$a$.

To illustrate, an instance of the virtual seat 408A to be displayed in an initial image frame in the series has physical parameters PPi to provide a decompressed position Dpi and a decompressed orientation DOi of the virtual seat 408A, and has graphical parameters GPi corresponding to the decompressed position Dpi and the decompressed orientation DOi of the virtual seat 408A. In the illustration, an instance of the virtual seat 408A to be displayed in a final image frame in the series has physical parameters PPf to provide a compressed position CPf and a compressed orientation COf, and has a final graphical parameters GPf corresponding to the compressed position CPf and the compressed orientation COf. In the illustration, all intermediate image frames between the initial and final image frames have physical parameters corresponding to intermediate positions and intermediate orientations, and have intermediate graphical parameters. Also, in the illustration, there is a time stamp on each image frame, such as the initial image frame, the intermediate image frames, and the final image frame, to provide a sequence of display of the image frames to display the virtual seat 408A from being decompressed to being compressed. In the illustration, the time stamps of the image frames are generated by the one or more processors 1 through P based on, such as to copy or to be synchronized with, times of generation of images including representations of movement of the seat 202A from the decompressed position Dpi and the decompressed orientation DOi and to the compressed position CPf and the compressed orientation COf. In the illustration, the times of generation of the images including the representations of movement of the seat 202A are generated by the camera 510 and received by the one or more processors 1 through P from the eyeglass 502 via the computer network 504 with the images.

Also, in the example, determining so, one or more of the processors 1 through P generate a series of audio frames having a sequence of output of the audio parameters AP1$a$ to output sounds as the virtual seat 408A is rising up. Continuing with the preceding illustration, an initial audio frame has an initial audio parameter to output an initial sound at a time the instance of the virtual seat 408A is to be displayed in the initial image frame. In the illustration, a final audio frame has a final audio parameter to output a final sound at a time the instance of the virtual seat 408A to be displayed in the final image frame. In the illustration, all intermediate audio frames between the initial and final audio frames have audio parameters corresponding to intermediate positions and intermediate orientations of the virtual seat 408A. Also, in the illustration, there is a time stamp on each audio frame, such as the initial audio frame, the intermediate audio frames, and the final audio frame, to provide a sequence of output of the audio frames as sound while the virtual seat 408A is displayed from being decompressed to being compressed. In the illustration, the time stamps of the audio frames are generated by the one or more processors 1 through P based on, such as to copy or to be synchronized with, times of generation of audio data generated in synchronization with movement of the seat 202A from the decompressed position Dpi and the decompressed orientation DOi and to the compressed position CPf and the compressed orientation COL In the illustration, the times of generation of the audio data generated in synchronization with movement of the seat 202A are generated by the processor of the microphone 518 and received by the one or more processors 1 through P from the eyeglass 502 via the computer network 504 with the audio data.

Continuing with the example, one or more of the processors 1 through P send the audio frames generated from the audio parameters AP1$a$ to the audio encoder 524. Also, in the example, one or more of the processors 1 through P send the image frames generated from the graphical parameters GP1*a* and generated based on the physical parameters PP1*a* to the video encoder 526. In the example, the audio encoder 524 applies the audio encoding protocol to the audio frames generated from the audio parameters AP1*a* to output encoded audio frames, and provides the encoded audio frames to the network transfer device 516. Further, in the example, the video encoder 526 applies the video encoding protocol to the image frames generated from the graphical parameters GP1*a* to output encoded image frames, and provides the encoded image frames to the network transfer device 516.

In the example, the network transfer device 516 applies the network transfer protocol to the encoded image frames received from the video encoder 526 and to the encoded audio frames received from the audio encoder 524 to generate data packets. Also, in the example, the network transfer device 516 sends the data packets via the computer network 504 to the network transfer device 514. Continuing with the example, the network transfer device 514 receives the data packets and applies the network transfer protocol to the data packets to extract the encoded image frames and the encoded audio frames. In the example, the network transfer device 514 sends the encoded image frames to the video decoder 528 of the eyeglass 502 and the encoded image frames to the audio decoder 530 of the eyeglass 502.

Also, in the example, the video decoder 528 applies the video decoding protocol to the encoded image frames to output image frames for display of the virtual seat 408A as being compressed from being decompressed, and provides the image frames to the CPU 504 of the eyeglass 502. In the example, the audio decoder 530 of the eyeglass 502 applies the audio decoding protocol to the encoded audio frames to output audio frames for outputting sounds synchronous with the display of the virtual seat 408A being compressed from being decompressed, and provides the audio frames to the CPU 504. In the example, the CPU 504 controls the GPU 506 to further control the display screen 508 to display the virtual seat 408A of the virtual chair 408 as being modified from the initial decompressed position DPi and the initial decompressed orientation DOi to the final compressed position DPf and the final compressed orientation DOf. In the example, the modification from the initial decompressed position DPi and the initial decompressed orientation DOi to the final compressed position DPf and the final compressed orientation DOf is an example of the physical parameters PP1*a*. In the example, the GPU 506 displays the virtual seat 408A as having the graphical parameters GP1*a* in synchronization with the movement of the virtual seat 408A from the initial decompressed position DPi and the initial decompressed orientation DOi to the final compressed position DPf and the final compressed orientation DOf. Also, in the example, the CPU 504 controls the sound output system 602 of the eyeglass 502 to output sounds in synchronization with the display of the virtual seat 408A being compressed from the initial decompressed position DPi and the initial decompressed orientation DOi to the final compressed position DPf and the final compressed orientation DOf. In the example, the sounds are output according to the audio frames received by the CPU 504.

Figure 7:
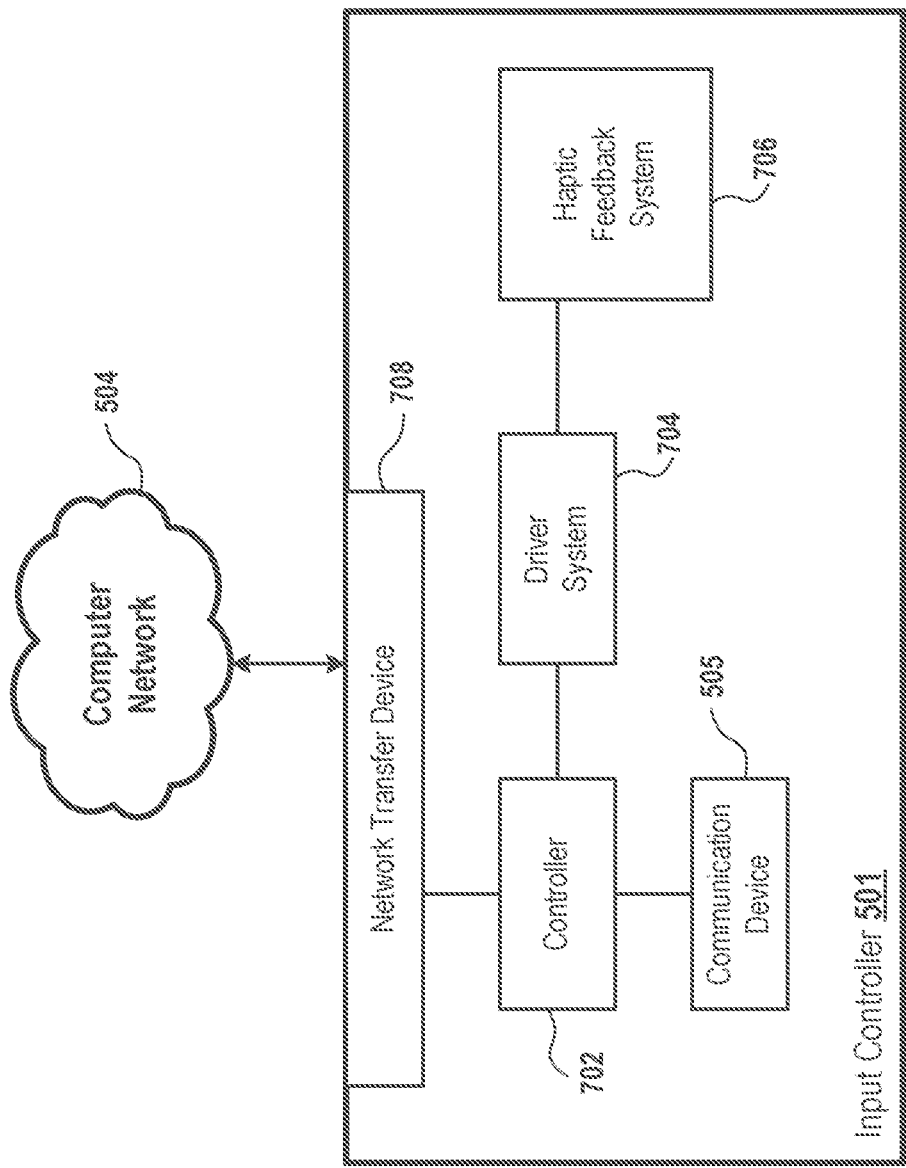
FIG. 7 is a diagram of an embodiment of an input controller to illustrate haptic feedback.

FIG. 7 is a diagram of an embodiment of the input controller 501. The input controller 501 includes a controller 702, a driver system 704, a haptic feedback system 706, and a network transfer device 708. An example of the controller 702 includes a combination of a processor and a memory device. To illustrate, the controller 702 includes a microprocessor or is a microcontroller. An example of a driver system includes one or more drivers, such as one or more transistors. An example of a haptic feedback system, as described herein, includes one or more haptic feedback devices, such as actuators. Examples of actuators include motors. The controller 702 is coupled to the network transfer device 708 and the communication device 505. The controller 702 is also coupled to the driver system 704, which is coupled to the haptic feedback system 706. The network transfer device 708 is coupled to the computer network 504.

The controller 708 receives the haptic feedback data from the one or more of the processors 1 through P (FIG. 5) via the network transfer device 708 and the computer network 504. Upon receiving the haptic feedback data, the controller 708 sends one or more control signals to the driver system 704 based on the haptic feedback data. In response to receiving the control signals, the driver system 704 generates one or more driver signals, such as current signals, and sends the one or more driver signals to the haptic feedback system 706. Upon receiving the one or more driver signals, the haptic feedback system 706 vibrates to provide haptic feedback to the user 7, who is holding the input controller 501. For example, the controller 708 sends the one or more control signals to the driver system 704 during the same time period in which the GPU 506 (FIG. 5) displays the virtual robot 456 to interact with the coffee table 452. As another example, the controller 708 sends the one or more control signals to the driver system 704 simultaneous with sending of a control signal from the GPU 506 to the display screen 508 (FIG. 5) to display the virtual robot 456 as interacting with the coffee table 452.

In an embodiment, the eyeglass 502 (FIG. 5) or the other body connected device includes a driver system and a haptic feedback system. The CPU 504 (FIG. 5) is coupled to the driver system of the eyeglass 502. The driver system is coupled to the haptic feedback system of the eyeglass 502. The CPU 504 receives the haptic feedback data from the one or more of the processors 1 through P (FIG. 5) via the network transfer device 514 (FIG. 5) and the computer network 504. Upon receiving the haptic feedback data for the eyeglass 502, the CPU 504 sends one or more control signals to the driver system of the eyeglass 502 based on the haptic feedback data. In response to receiving the control signals, the driver system generates one or more driver signals and sends the one or more driver signals to the haptic feedback system of the eyeglass 502. Upon receiving the one or more driver signals, the haptic feedback system vibrates to provide haptic feedback to the user 7, who is wearing the eyeglass 502. For example, the CPU 504 sends the one or more control signals to the driver system of the eyeglass during the same time period in which the GPU 506 (FIG. 5) displays the virtual robot 456 to interact with the coffee table 452. As another example, the CPU 504 sends the one or more control signals to the driver system simultaneous with sending of a control signal from the GPU 506 to the display screen 508 (FIG. 5) to display the virtual robot 456 as interacting with the coffee table 452.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for determining a type of material of a real-world object in a real-world environment, comprising:
   capturing, by a microphone, a set of audio data based on sounds output in the real-world environment, wherein the real-world environment includes the real-world object, wherein the set of audio data is in a digital format;
   providing the set of audio data captured from the real-world environment to an artificial intelligence (AI) model for determining the type of material of the real-world object within the real-world environment, wherein the set of audio data is processed to determine an audio parameter of the set of audio data and the type of material is determined based on a comparison of the audio parameter of the set of audio data with an additional audio parameter of an additional audio data set;
   rendering, in a virtual environment, a first virtual object having the type of material in of the real-world object; and
   providing the set of audio data to be output as sound when the first virtual object in the virtual environment interacts with a second virtual object in the virtual environment.

2. The method of claim 1, further comprising:
   receiving a plurality of sets of audio data based on sounds received from a plurality of real-world objects within a plurality of real-world environments;
   additionally receiving a plurality of output parameters regarding the plurality of real-world objects within the plurality of real-world environments;
   training the AI model based on the plurality of sets of audio data and the plurality of output parameters.

3. The method of claim 2, further comprising extracting a plurality of features from the plurality of sets of audio data, wherein the plurality of features include a plurality of amplitudes of the plurality of sets of audio data and a plurality of frequencies of the plurality of sets of audio data, wherein the plurality of sets of audio data include the additional audio data set and the plurality of features include the additional audio parameter.

4. The method of claim 3, further comprising:
   classifying the plurality of features to output associations between the plurality of features and the plurality of output parameters,
   wherein said training the AI model includes providing, to the AI model, the associations between the plurality of features and the plurality of output parameters,
   wherein said determining the type of material includes determining, by the AI model, based on the associations between the plurality of features and the plurality of output parameters, a probability that the set of audio data captured from the real-world environment indicates the type of material of the real-world object.

5. The method of claim 3, further comprising receiving a plurality of sets of input data including a plurality of sets of image data captured by a plurality of cameras in the plurality of real-world environments, or light detection and ranging (LiDAR) data captured from the plurality of real-world environments, or inertial measurement unit (IMU) data captured from the plurality of real-world environments, or a combination thereof, wherein said extracting the plurality of features comprises extracting the plurality of features from the plurality of sets of input data, wherein the plurality of features include a plurality of identities of the plurality of real-world objects, a plurality of physical parameters defining movements of the plurality of real-world objects and a plurality of graphical parameters of the plurality of real-world objects.

6. The method of claim 5, wherein the plurality of physical parameters include a first physical parameter and a second physical parameter, wherein the plurality of graphical parameters include a first graphical parameter and a second graphical parameter, the method further comprising:

classifying the plurality of features to output associations between the plurality of features and the plurality of output parameters,
wherein said training the AI model includes providing, to the AI model, the associations between the plurality of features and the plurality of output parameters.

7. The method of claim 6, wherein said determining the type of material of the real-world object within the real-world environment includes determining a probability that the real-world object has the type of material, wherein the probability is determined based on the associations between the plurality of features and the plurality of output parameters.

8. The method of claim 7, further comprising:
generating virtual object data for display of the first virtual object as interacting with the second virtual object in the virtual environment;
accessing the set of audio data to be output by the first virtual object as the first virtual object interacts with the second virtual object; and
generating haptic feedback data to be output by a body connected device as the first virtual object interacts with the second virtual object, wherein the virtual object data represents the type of material, a movement of the real-world object from the first physical parameter to the second physical parameter in the real-world environment, and a change from the first graphical parameter to the second graphical parameter of the real-world object in the real-world environment.

9. The method of claim 2, wherein the plurality of output parameters include data identifying the plurality of materials of the plurality of real-world objects in the plurality of real-world environments, the method further comprising simulating a virtual interaction between the first virtual object of a video game and the second virtual object based on the type of material.

10. The method of claim 2, further comprising receiving a plurality of sets of input data, wherein the plurality of sets of input data include a plurality of sets of image data captured by a plurality of cameras in the plurality of real-world environments, wherein the plurality of sets of audio data and the plurality of image data sets are captured when the plurality of real-world objects interact with a plurality of users in the plurality of real-world environments.

11. A server for determining a type of material of a real-world object in a real-world environment, comprising:
a processor configured to:
receive, from a microphone in the real-world environment, a set of audio data, wherein the set of audio data has a digital format and is captured based on sounds output in the real-world environment, wherein the real-world environment includes the real-world object;
provide the set of audio data captured from the real-world environment to an artificial intelligence (AI) model to determine the type of material of the real-world object within the real-world environment, wherein the set of audio data is provided to be processed, wherein the set of audio data is processed to determine an audio parameter of the set of audio data and the type of material is determined based on a comparison of the audio parameter of the set of audio data with an additional audio parameter of an additional audio data set;
provide the type of material to a client device to facilitate a display, in a virtual environment, of a first virtual object having the type of material of the real-world object; and
provide the set of audio data to be output as sound when the first virtual object interacts with a second virtual object in the virtual environment; and
a memory device coupled to the processor.

12. The server of claim 11, wherein the processor is configured to:
receive a plurality of sets of audio data based on sounds received from a plurality of real-world objects within a plurality of real-world environments;
additionally receive a plurality of output parameters regarding the plurality of real-world objects within the plurality of real-world environments; and
train the AI model based on the plurality of sets of audio data and the plurality of output parameters.

13. The server of claim 12, wherein the processor is configured to extract a plurality of features from the plurality of sets of audio data, wherein the plurality of features include a plurality of amplitudes of the plurality of sets of audio data and a plurality of frequencies of the plurality of sets of audio data, wherein the plurality of sets of audio data include the additional audio data set and the plurality of features include the additional audio parameter.

14. The server of claim 13, wherein the AI model is trained based on the plurality of sets of audio data and the plurality of output parameters.

15. The server of claim 14, wherein the processor is configured to:
classify the plurality of features to output associations between the plurality of features and the plurality of output parameters,
wherein to train the AI model, the processor is configured to provide, to the AI model, the associations between the plurality of features and the plurality of output parameters,
wherein to determine the type of material, the processor is configured to determine, using the AI model, based on the associations between the plurality of features and the plurality of output parameters, a probability that the set of audio data captured from the real-world environment indicates the type of material.

16. The server of claim 13, wherein the processor is configured to receive a plurality of sets of input data, wherein the plurality of sets of input data include a plurality of sets of image data captured by a plurality of cameras in the plurality of real-world environments, or light detection and ranging (LiDAR) data captured from the plurality of real-world environments, or inertial measurement unit (IMU) data captured from the plurality of real-world environments, or a combination thereof, wherein to extract the plurality of features, the processor is configured to obtain the plurality of features from the plurality of sets of input data, wherein the plurality of features include a plurality of identities of the plurality of real-world objects, a plurality of physical parameters defining movements of the plurality of real-world objects and a plurality of graphical parameters of the plurality of real-world objects.

17. The server of claim 16, wherein the plurality of physical parameters include a first physical parameter and a second physical parameter, wherein the plurality of graphical parameters include a first graphical parameter and a second graphical parameter, wherein the processor is configured to:

classify the plurality of features to output associations between the plurality of features and the plurality of output parameters,
wherein the processor is configured to train the AI model based on the plurality of sets of audio data and the plurality of output parameters, wherein to train the AI model, the processor is configured to provide, to the AI model, the associations between the plurality of features and the plurality of output parameters.

18. The server of claim 17, wherein to determine the type of material of the object within the real-world environment, the processor is configured to determine a probability that the real-world object has the type of material, wherein the probability is determined based on the associations between the plurality of features and the plurality of output parameters.

19. The server of claim 18, wherein the processor is configured to:
generate virtual object data for display of the first virtual object as interacting with the second virtual object in the virtual environment;
access audio data to be output by the first virtual object as the first virtual object interacts with the second virtual object; and
generate haptic feedback data to be output by a body connected device as the first virtual object interacts with the second virtual object, wherein the virtual object data represents the type of material, a movement of the real-world object from the first physical parameter to the second physical parameter in the real-world environment, and a change from the first graphical parameter to the second graphical parameter of the object in the real-world environment.

20. A system for determining a type of material of a real-world object in a real-world environment, comprising:
a client device including a microphone configured to capture a set of audio data from the real-world environment, wherein the set of audio data has a digital format and is captured based on sounds output in the real-world environment; and
a server coupled to the client device via a computer network, wherein the server is configured to:
receive the set of audio data from the client device via the computer network;
provide the set of audio data captured from the real-world environment to an artificial intelligence (AI) model to determine the type of material of the real-world object within the real-world environment, wherein the set of audio data is processed to determine an audio parameter of the set of audio data and the type of material is determined based on a comparison of the audio parameter of the set of audio data with an additional audio parameter of an additional audio data set;
provide the type of material to facilitate a display, in a virtual environment, of a first virtual object having the type of material of the real-world object; and
provide the set of audio data to be output as sound when the first virtual object interacts with a second virtual object in the virtual environment.

21. The system of claim 20, further comprising:
a plurality of client devices configured to:
generate a plurality of sets of audio data based on sounds received from a plurality of real-world objects within a plurality of real-world environments;
receive a plurality of output parameters regarding a plurality of types of materials of the plurality of real-world objects,
wherein the server is coupled to the plurality of client devices via the computer network, wherein the server is configured to:
receive the plurality of sets of audio data via the computer network from the plurality of client devices;
receive the plurality of output parameters via the computer network from the plurality of client devices;
train the AI model based on the plurality of sets of audio data and the plurality output parameters; and
extract a plurality of features from the plurality of sets of audio data, wherein the plurality of features include a plurality of amplitudes of the plurality of sets of audio data and a plurality of frequencies of the plurality of sets of audio data, wherein the plurality of sets of audio data include the additional audio data set and the plurality of features include the additional audio parameter.

22. The system of claim 21, wherein the server is configured to classify the plurality of features to output associations between the plurality of features and the plurality of output parameters,
wherein to train the AI model, the server is configured to provide, to the AI model, the associations between the plurality of features and the plurality of output parameters,
wherein to determine the type of material, the server is configured to determine, using the AI model, based on the associations between the plurality of features and the plurality of output parameters, a probability that the set of audio data captured from the real-world environment indicates the type of material.

* * * * *